March 7, 1944.  O. J. POUPITCH  2,343,798
SCREW AND WASHER ASSEMBLY MACHINE
Filed July 1, 1939  10 Sheets-Sheet 1
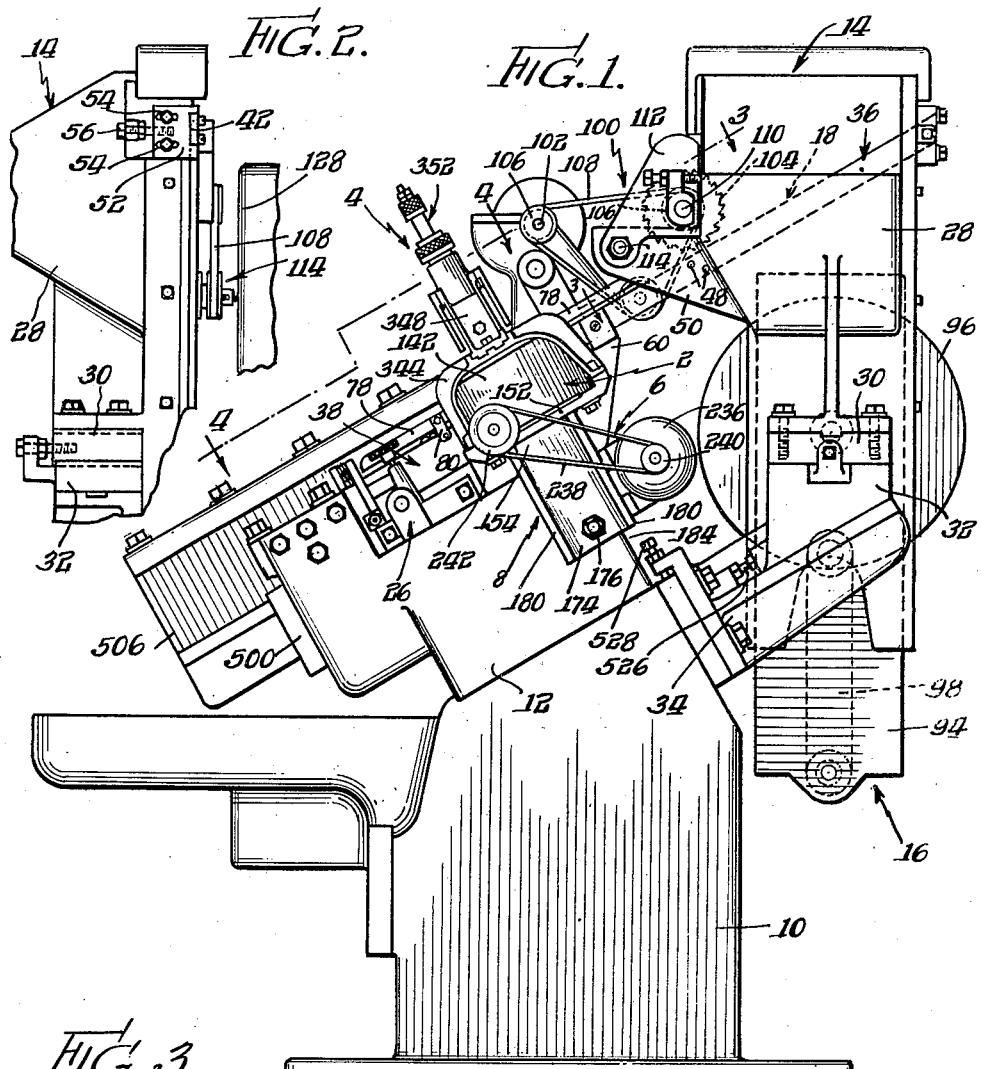
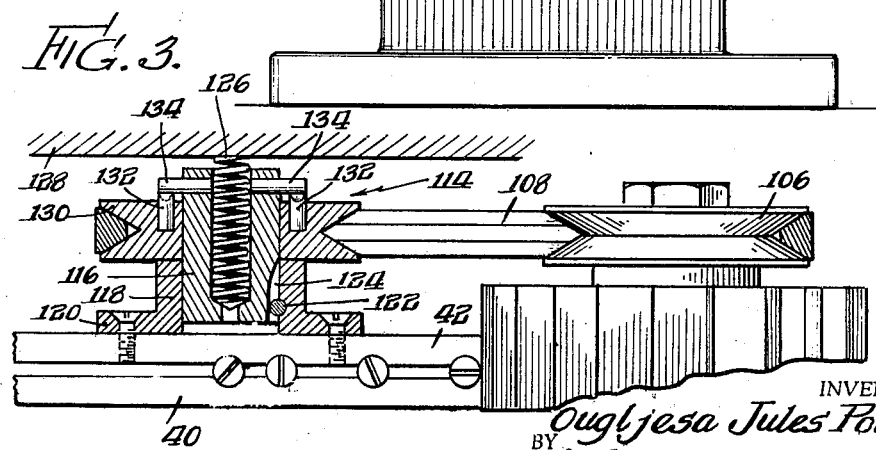
INVENTOR.
Ougljesa Jules Poupitch
BY Cox & Moore
ATTORNEYS.

March 7, 1944.   O. J. POUPITCH   2,343,798
SCREW AND WASHER ASSEMBLY MACHINE
Filed July 1, 1939   10 Sheets-Sheet 2

INVENTOR.
Ougljesa Jules Poupitch
BY Cox & Moore
ATTORNEYS.

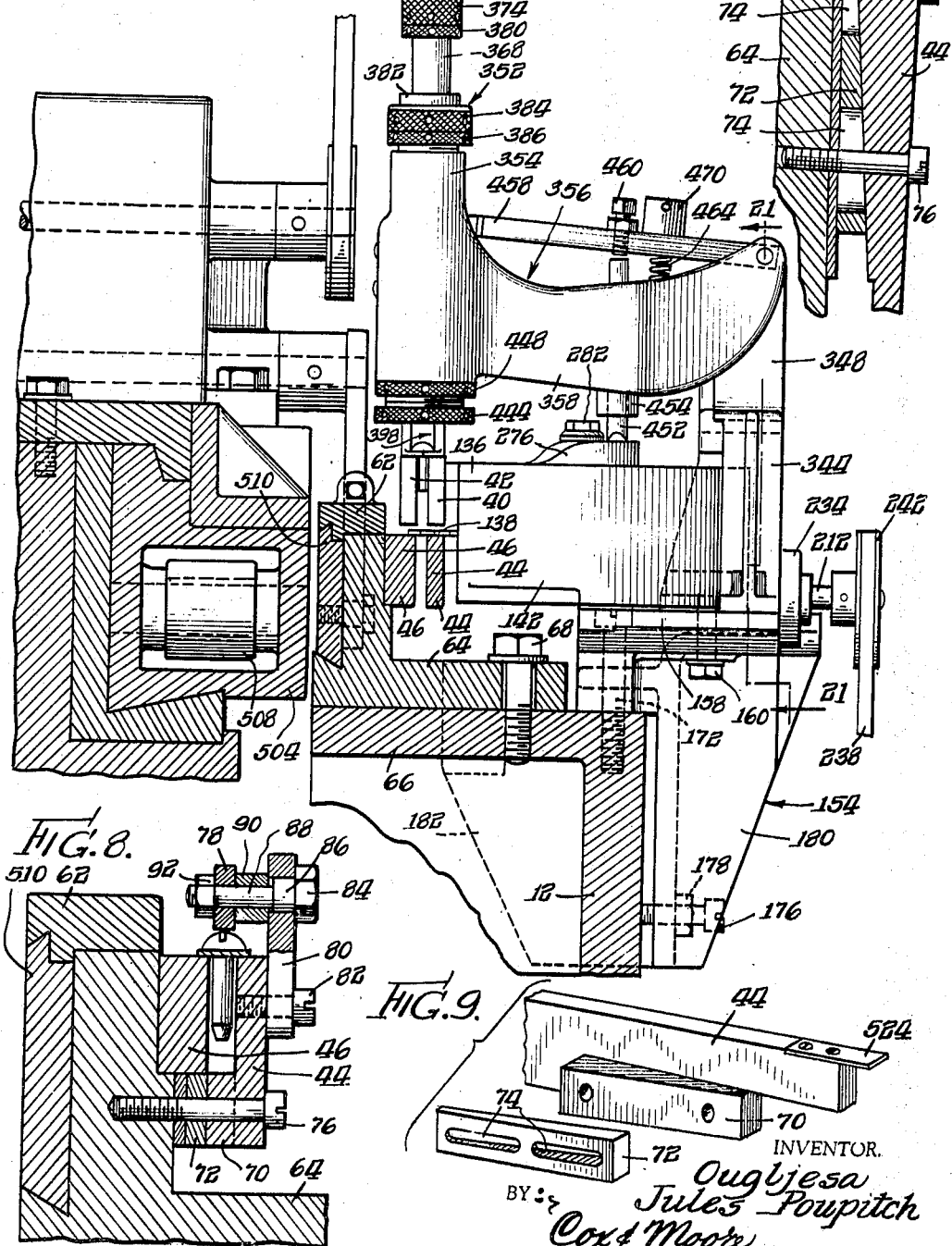

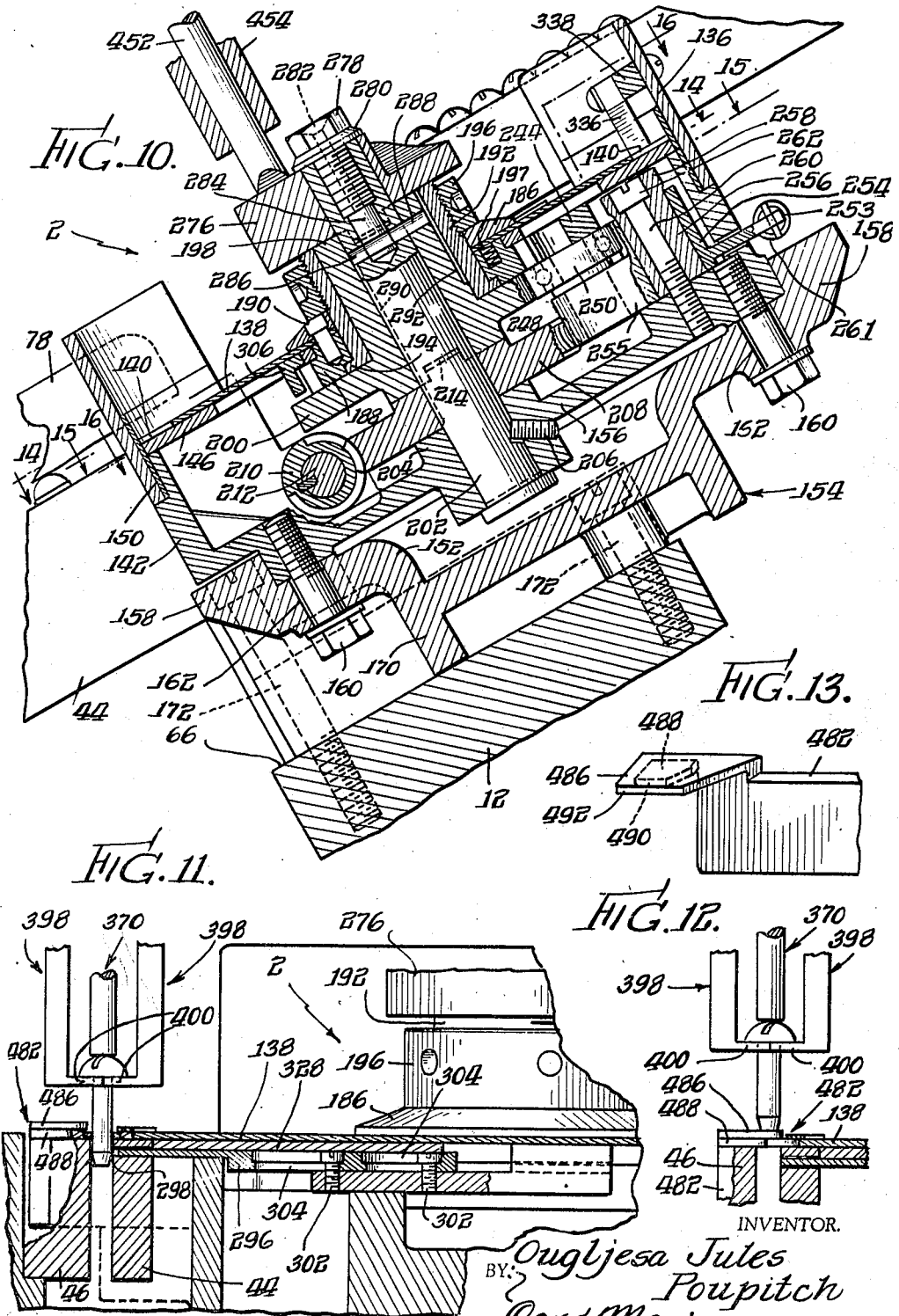

March 7, 1944.   O. J. POUPITCH   2,343,798
SCREW AND WASHER ASSEMBLY MACHINE
Filed July 1, 1939   10 Sheets-Sheet 5

INVENTOR.
Ougljesa Jules Poupitch
BY: Cox & Moore
ATTORNEYS

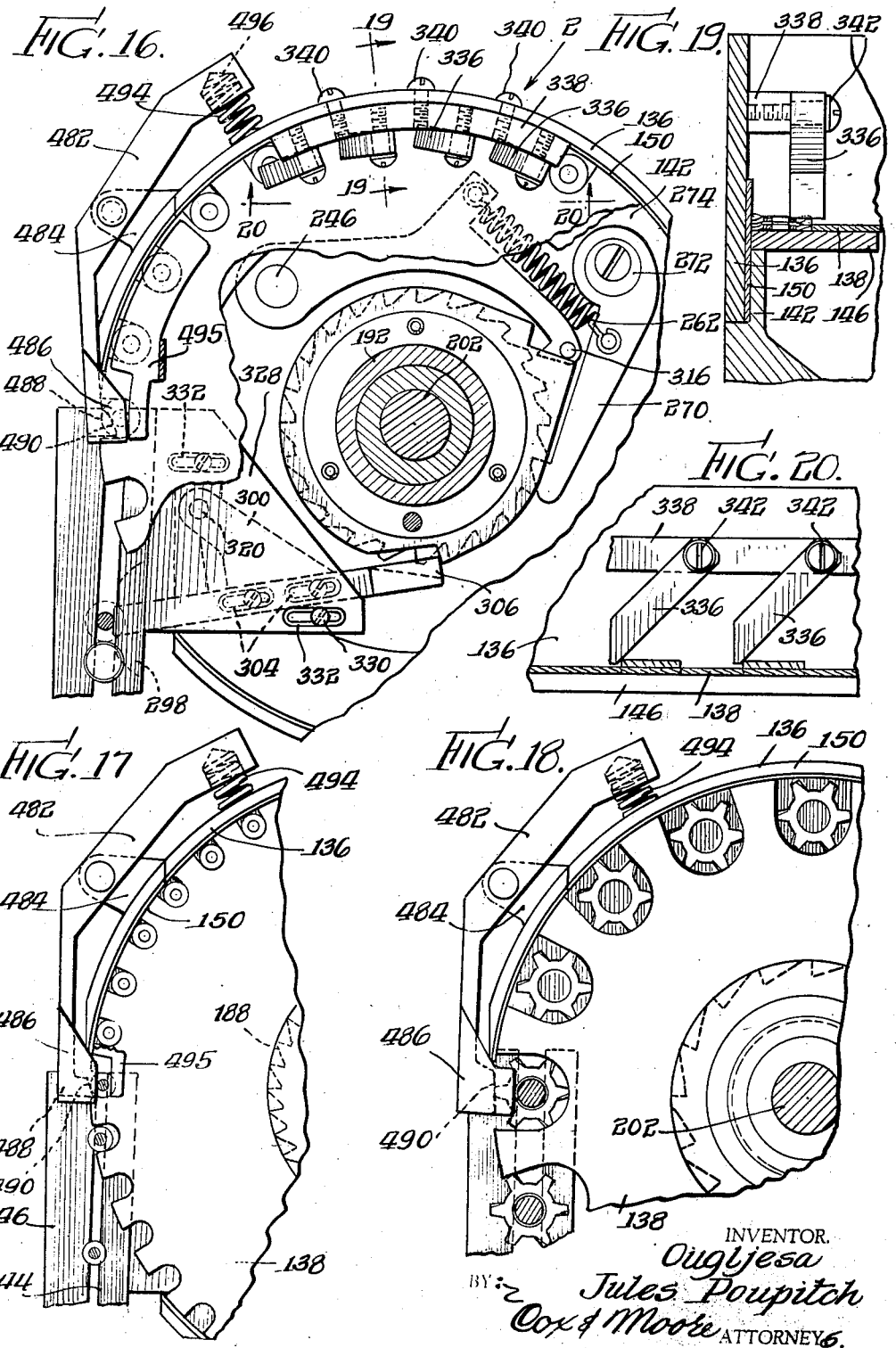

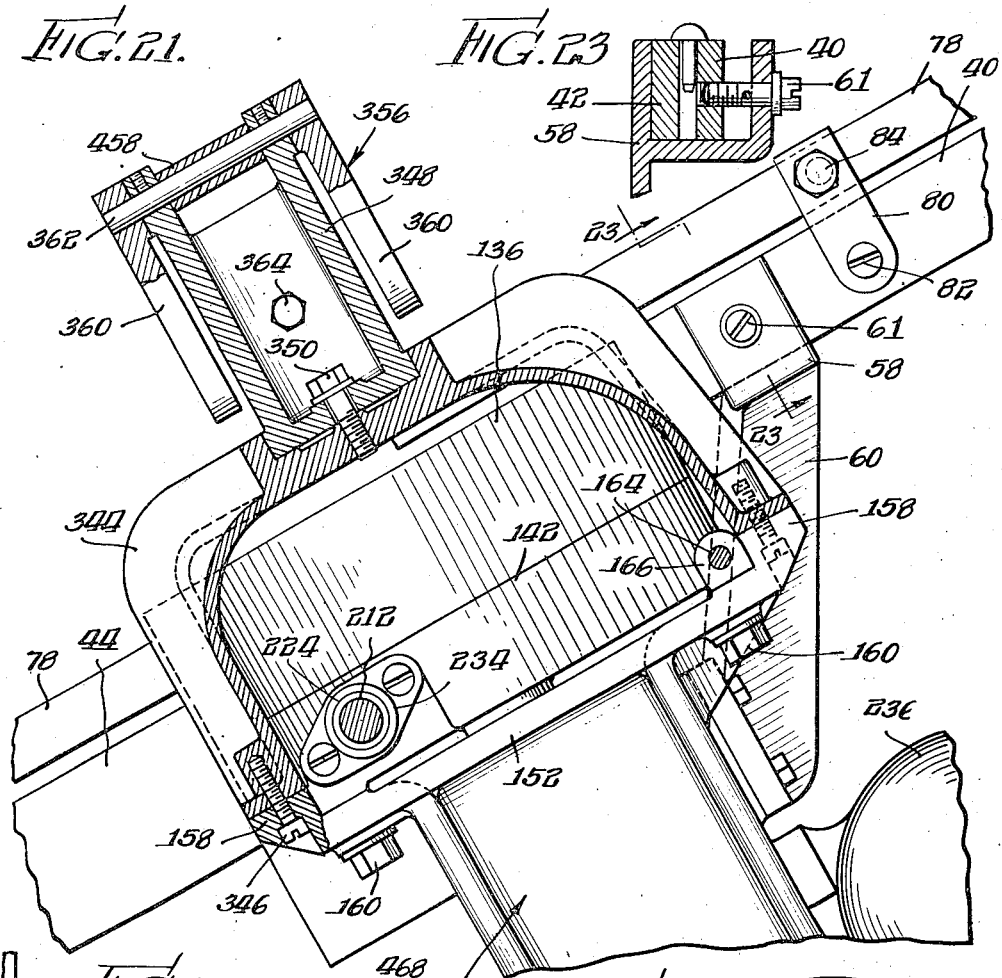
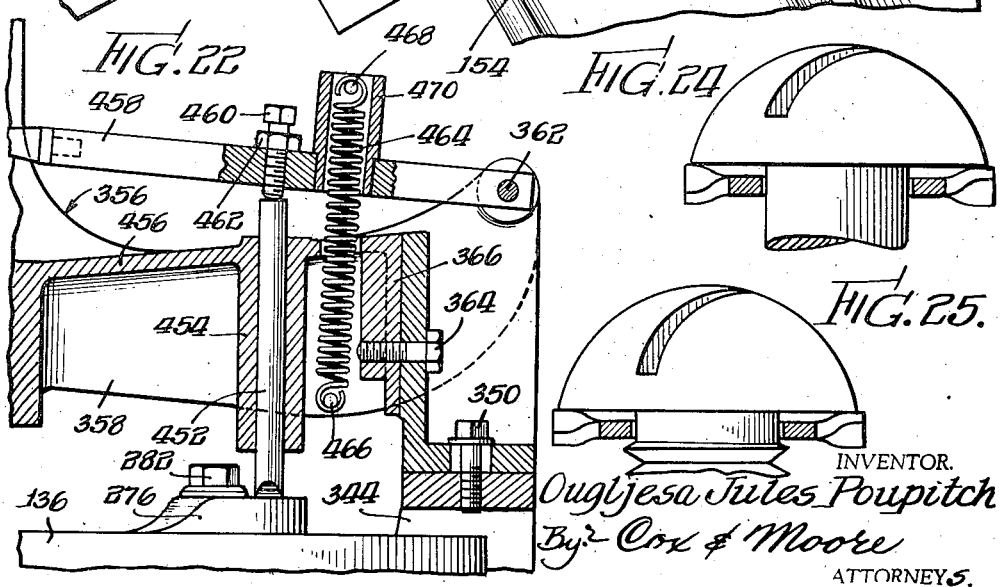

March 7, 1944. O. J. POUPITCH 2,343,798
SCREW AND WASHER ASSEMBLY MACHINE
Filed July 1, 1939 10 Sheets-Sheet 8
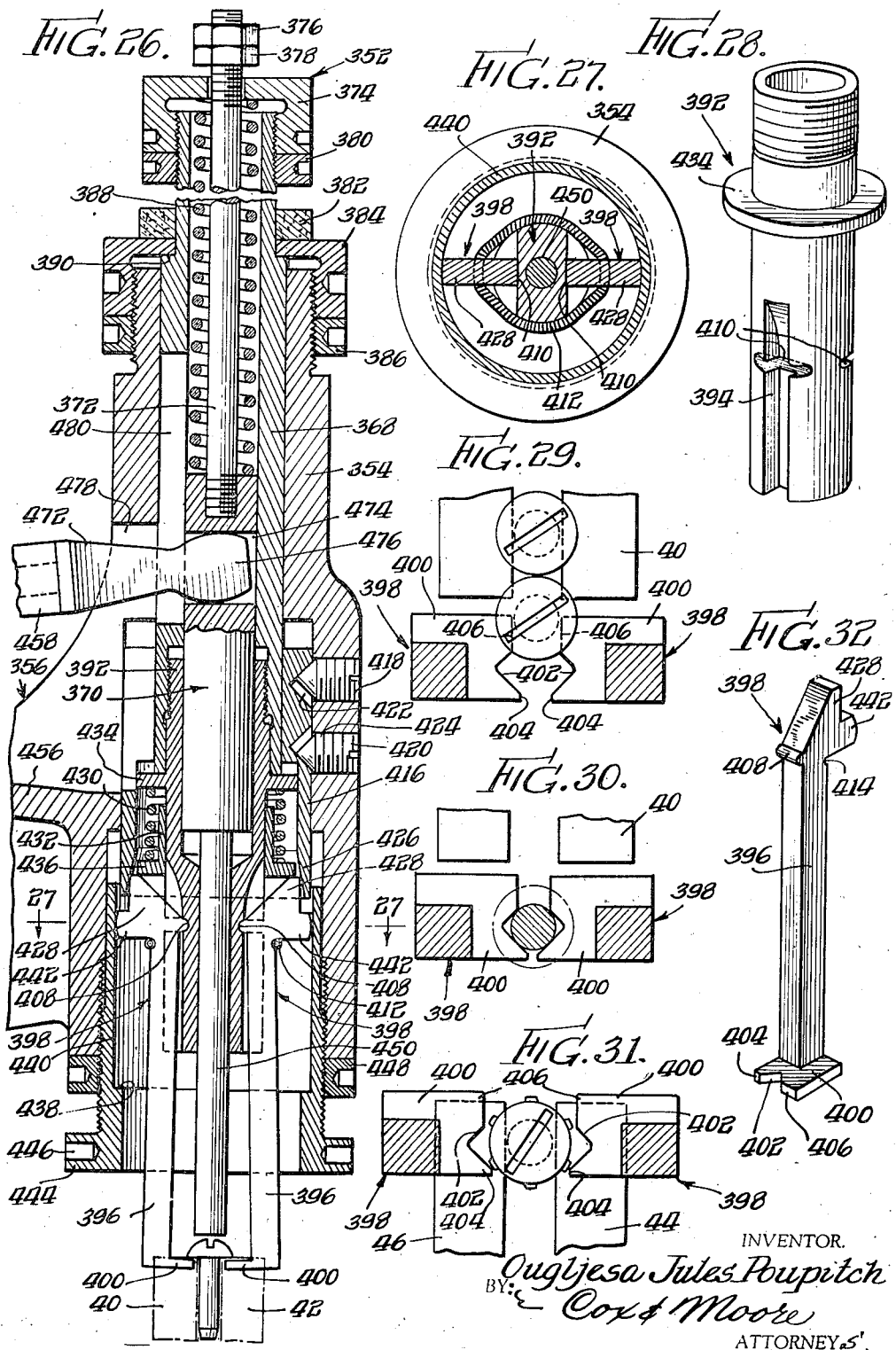
INVENTOR.
Ougljesa Jules Poupitch
BY Cox & Moore
ATTORNEYS.

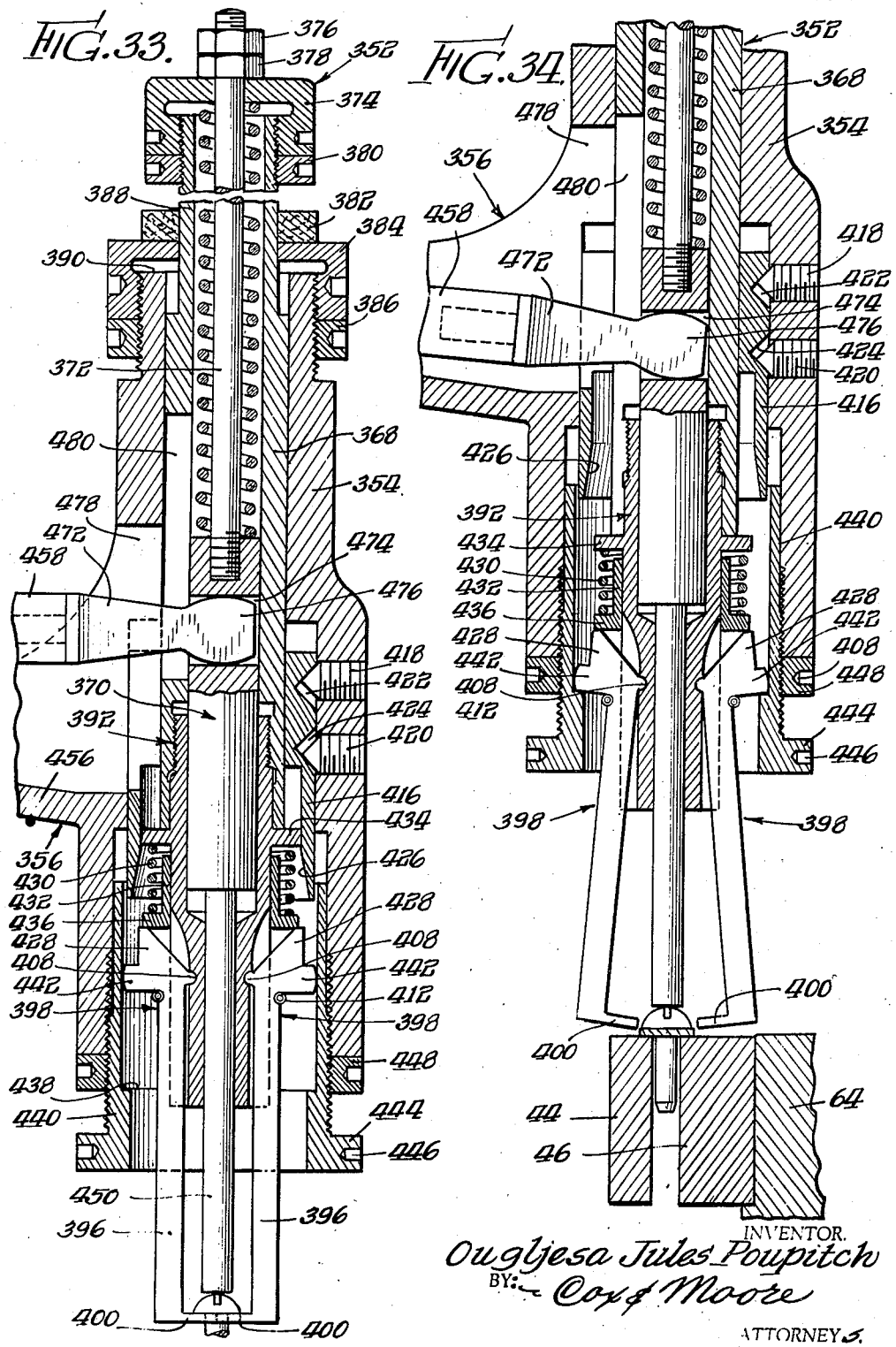

March 7, 1944. O. J. POUPITCH 2,343,798
SCREW AND WASHER ASSEMBLY MACHINE
Filed July 1, 1939 10 Sheets-Sheet 10

INVENTOR.
Ougljesa Jules Poupitch
BY Cox & Moore
ATTORNEYS.

Patented Mar. 7, 1944

2,343,798

UNITED STATES PATENT OFFICE 2,343,798

SCREW AND WASHER ASSEMBLY MACHINE

Ougljesa J. Poupitch, Chicago, Ill., assignor to Illinois Tool Works, Chicago, Ill., a corporation of Illinois Application July 1, 1939, Serial No. 282,517

33 Claims. (Cl. 29—84)

This invention relates to a screw and washer assembly machine for manufacturing assembled units of screws and washers and more particularly to a mechanism or machine which may be readily attached to or associated with any standard screw working machine for converting said machine into a machine for manufacturing combined screw and washer units.

It is an object of this invention to provide a relatively simple, compact and light-weight mechanism including its own source of power which may be readily attached to a standard thread rolling machine whereby in advance of the thread rolling mechanism of the standard machine, each screw blank is assembled with a washer so that upon rolling of the threads, each washer will be held in permanently assembled relation to each screw element.

A further object of the invention is to provide a machine or mechanism including means for feeding washers to an assembly mechanism whereby the washers are assembled with screws being fed by the feeding or conveying mechanism of a standard thread rolling machine or similar machine or whereby the washers are assembled with screws fed thereto by a mechanism forming a part of an assembly machine, and which assembly mechanism or machine may be attached to or positioned in relation with such standard machine that with a minimum of expense the standard machine may be converted into a machine for manufacturing combined screw and washer units.

A further object of the invention is to provide a mechanism or machine of the above stated character having readily adjustable parts possessing in the aggregate great flexibility of adjustment so that the mechanism or machine may readily be associated in proper operative relation with all or with substantially all, standard thread rolling machines, and which may be adjusted with ease to accommodate different sizes of screws and washers.

Applicant's invention further contemplates the provision of an assembling machine or attachment which may be associated with a standard screw working machine, which assembly machine or attachment includes a device which carries the washers from a container to an instrumentality which telescopes each washer with a screw element and which device then carries the telescoped washers and screw elements to the screw element feeding means of the standard screw working machine.

Another object of applicant's invention is to provide in an assembling machine mechanism or attachment wherein means is provided for preventing feeding of screw elements if a washer is not presented to the assembling device at the time such device would normally operate; for suspending operation of an assembling device which carries washers from a container to the assembling device if the device which carries the assembled units from the assembly device becomes filled with such units, or if an assembled unit becomes jammed in said device.

It is also an object of applicant's invention to provide in a screw and washer assembling mechanism or device means for feeding washers from a container to a point of assembly and which device returns the washers to the container if no screw element is fed to the point of assembly at the proper instant.

Other objects and advantages of the invention will be apparent from the following description when taken in connection with the accompanying drawings wherein:

Fig. 1 is a view in vertical elevation of one form of standard thread rolling machine having attached thereto a combined washer feeding and assembly mechanism embodying the invention.

Fig. 2 is a fragmentary view in vertical elevation of a rear portion of the machine shown in Fig. 1.

Fig. 3 is an enlarged fragmentary section taken along the lines 3—3 of Fig. 1.

Fig. 6 is a fragmentary section taken along the line 6—6 of Fig. 4.

Fig. 7 is an enlarged fragmentary section taken along the line 7—7 of Fig. 5.

Fig. 8 is an enlarged fragmentary section taken along the line 8—8 of Fig. 5.

Fig. 9 is an exploded perspective view of an attachment for facilitating the adjustment of a feeding and guiding chute.

Fig. 10 is an enlarged fragmentary section taken at right angles to Fig. 6 and substantially along the line 10—10 of Fig. 4.

Fig. 11 is an enlarged view in section taken along the line 11—11 of Fig. 14.

Fig. 12 is a view of a portion of Fig. 11 showing the operation of a washer sensing device preventing the feeding of a screw element when no washer is present for assembly therewith.

Fig. 13 is a detailed perspective view of the end portion of the washer sensing device.

Fig. 16 is a fragmentary section taken along the line 16—16 of Fig. 10, but with certain parts broken away for purposes of illustration.

Figs. 17 and 18 are fragmentary views of a portion of Fig. 14 showing with said Fig. 14 the position of certain parts in accommodating screws and washers of different sizes.

Fig. 19 is an enlarged fragmentary section taken along the line 19—19 of Fig. 16.

Fig. 20 is an enlarged fragmentary section taken along the line 20—20 of Fig. 16.

Fig. 21 is an enlarged fragmentary section taken along the line 21—21 of Fig. 6.

Fig. 22 is an enlarged fragmentary section taken along the line 22—22 of Fig. 4.

Fig. 23 is a fragmentary section taken along the line 23—23 of Fig. 21.

Fig. 24 is a fragmentary vertical elevation of a screw blank and lock washer assembly prior to to the rolling of a thread on the blank.

Fig. 25 is a fragmentary vertical elevation similar to Fig. 24, but with a thread rolled on the blank.

Fig. 26 is an enlarged fragmentary section taken along the line 26—26 of Fig. 4.

Fig. 27 is a section taken along the line 27—27 of Fig. 26.

Fig. 28 is a detailed view in perspective illustrating the jaw carrying member forming a part of the mechanism shown in Fig. 26.

Figs. 29, 30 and 31 are detailed fragmentary views in part illustrative of the operation of the mechanism shown in Fig. 26.

Fig. 32 is a detailed view in perspective of a screw carrying and clamping member forming a part of the mechanism shown in Fig. 26.

Figs. 33 and 34 are views similar to Fig. 26 for illustrating the operation of the mechanism shown in Fig. 26.

Figure 4:
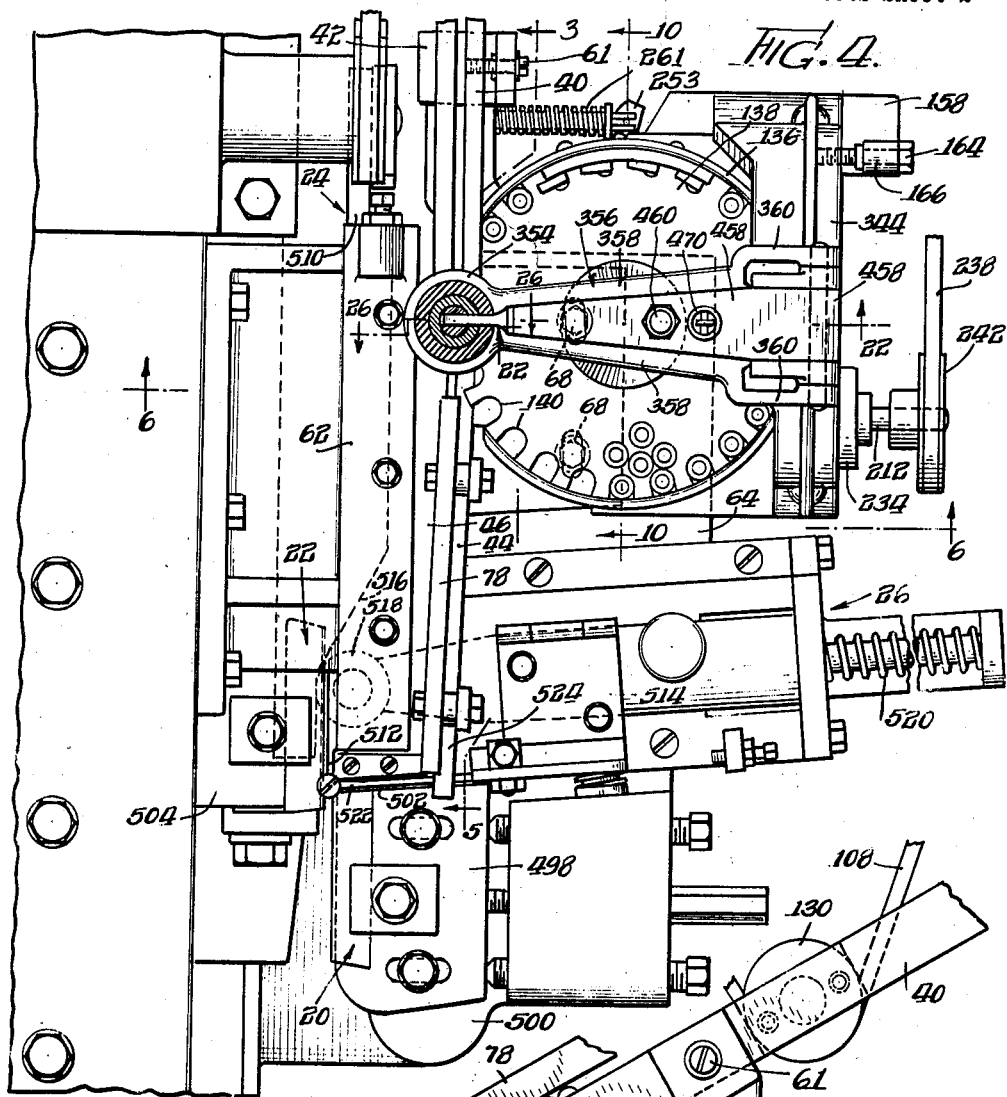
Fig. 4 is an enlarged fragmentary view partly in plan and partly in section taken along the line 4—4 of Fig. 1.
Figure 5:
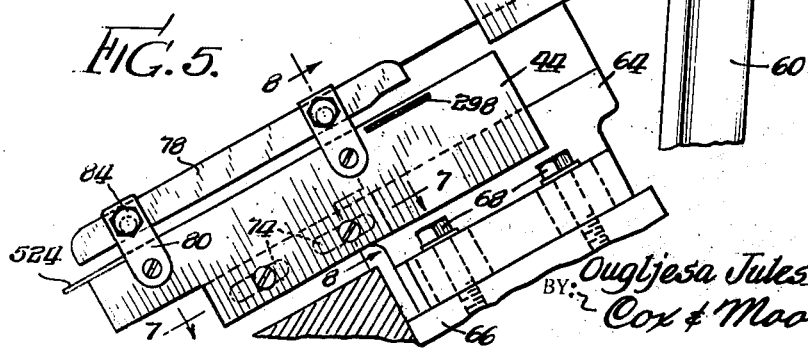
Fig. 5 is a vertical section taken substantially along the line 5—5 of Fig. 4.

As shown in Figs. 1 to 34 of the drawings, a machine which forms one embodiment of the present invention comprises a screw thread rolling machine of standard type, such as shown in Wilcox Patents No. 1,584,263 of May 11, 1926, and No. 1,798,919 of March 31, 1931, for which is provided a self-contained, self-powered attachment by which said machine may be adapted for the production of permenently assembled screw and washer units. Auxiliary elements hereinafter described may be provided by way of refinement of the standard machine to facilitate adjustment of the machine to accommodate the attachment and to improve the operation of such machine. This attachment preferably comprises a combined washer hopper and washer feed mechanism 2 and assembly mechanism 4, a driving mechanism 6 and a common mounting means 8 for the combined washer hopper and feed mechanism 2, the assembly mechanism 4 and the driving mechanism 6.

The screw thread rolling machine comprises a main base or pedestal 10; an auxiliary base or body 12 secured to or formed integrally with the base 10 and inclined at an angle of approximately thirty degrees to the horizontal; a hopper 14 for receiving a mass of screw blanks; a screw blank feeding mechanism 16 for discharging blanks from the hopper 14 onto the guide chute 18; a pair of thread rolling dies 20 and 22 (Fig. 4); a starter mechanism 24 and a transfer mechanism 26 and a driving mechanism, parts only of which are shown, for driving the screw blank feed mechanism 16, the movable thread rolling die 22, the starter mechanism 24 and the transfer mechanism 26.

*The hopper and feed mechanism for the screw blanks*

As shown in Figs. 1 to 4, the hopper 14 and feed mechanism 16 for the screw blanks comprise a hopper casting 28 bolted to an auxiliary block 30 which is provided to raise the level of the casting 28 and the upper portion of the guide chute 18. The block 30 is adjustably mounted on the standard hopper supporting casting 32 for adjustment at right angles to the guide chute 18. The casting 32 is adjustably mounted upon a casting 34 for adjustment of the hopper casting and the upper portion of the guide chute parallel to the plane of inclination of the guide chute. The casting 34 is mounted upon the rear of the base or pedestal 10 in a manner to permit adjustment of the casting 34, the hopper casting 28 and the upper portion of the guide chute vertically at right angles to the guide chute.

The guide chute 18 which may comprise the guide bars of the standard machine rearranged in accordance with the following description, or which may comprise substitute guide bars attachable to the standard machine in the following manner, comprises an upper section 36 and a lower section 38, each of which sections comprises a pair of laterally spaced bars, the bars of the upper section being indicated by the reference numerals 40 and 42 and the bars of the lower section being indicated by the reference numerals 44 and 46. The upper section 36 of the guide chute 18 is carried by the hopper casting 28, the outer bar 40 being fastened to the hopper casting as by bolts or the like 48 securing the bar 40 to the arm or bracket 50 projecting forwardly from the hopper casting 28. The bar 42 is bolted at its upper end to a plate 52 adjustably mounted as by bolts 54 passing through enlarged openings in the plate to the hopper casting 28, which casting carries an adjustable screw 56 by which the plate 52 and the bar 42 may be adjusted relative to the casting. The bars 40 and 42 of the upper section are supported relatively adjacent their lower ends upon a U-shaped portion 58 (Figs. 1, 5, 21, and 23) of a bracket 60 secured to or forming a part of the common mounting means 8, the bar 40 being adjustably secured to the portion 58 by a screw 61.

The inner bar 46 is preferably beveled or tapered as shown in Fig. 4, being of greater width at its upper end than at its lower end so as to provide the proper operating clearance between the assembly mechanism and the plate 62 covering the starter mechanism. If desired, the usual guide bar of rectangular configuration in plan view may be employed with suitable wedges being provided for insertion between the inner wall of the guide bar and the outer wall of the adjustable bracket 64 (Figs. 5, 7 and 8) upon which this guide bar is bolted or otherwise secured. The bracket 64 is adjustably mounted upon the shelf 66 of the auxiliary base or body 12 as by a bolt or bolts 68 received in an enlarged opening or openings in the bracket and threaded into the shelf 66. The outer guide bar 44 of the lower section 38 is adjustably mounted in proper spaced relation to the bar 46 and to facilitate adjustment of the outer bar relative to the inner bar, there may be provided the wedge blocks 70 and 72 (Figs. 8 and 9), the wedge block 70 being bolted or otherwise fastened to the inner surface of the bar 44 and the wedge block 72 being interposed between the wedge block 70 and the vertical wall of the bracket 64. The wedge block 72 is provided with a slot or slots 74 for receiving an attaching bolt or bolts 76. Upon loosening of the bolt or bolts 76, the wedge block 72 may be forced longitudinally in one or the other direction relative to the wedge block 70 so as to move the bar 44 toward or from the bar 46.

A cover plate 78 overlies each section of the guide chute 18 so as to extend over the heads of the screw units in each of the sections of this guide chute. To facilitate proper adjustment of the cover plates to accommodate screws having different size heads, there may be provided a strap or straps 80 for each section of the guide chute, the strap or straps 80 (Figs. 1 and 8) being each secured to the outer guide bar as by a screw 82. Each strap 80 carries a pin or bolt 84 having a portion 86 rotatably received in a circular opening in the strap and a shank portion 88 eccentric to the portion 86 and passing through an opening in the cover plate 78. A spacer strip 90 may be received on the pin or bolt 84 between the cover plate 78 and the strap 80. Upon rotation of the pin or bolt 84 a very fine vertical adjustment of the cover plate relative to the guide bars may be effected. The pin or bolt is clamped in adjusted position by a nut 92 received on the threaded free end thereof.

Screw blanks are fed from the mass in the hopper 14 onto the upper section 36 of the guide chute 18 by a reciprocating plate 94 slidably mounted in guideways formed in the hopper casting. The plate 94 is operated by a driving mechanism which includes a crank disc 96 connected to the plate 94 by a link or pitman 98. In raising the hopper casting by the insertion of a block 30, it becomes necessary to substitute a pitman of shorter length and such pitman may therefore be supplied with the attachment for the conversion of the standard thread rolling machine.

A clearing device 100 of conventional structure insures an interrupted procession of blanks down the upper section of the guide chute and prevents clogging of the passage from the hopper. It comprises a power actuated shaft 102 driving the clearing wheel or ratchet 104 by means of pulleys 106 and belt 108. The clearing wheel 104 is carried by a shaft 110, in turn carried by a bracket 112 adjustably secured as by bolt 114 to the forwardly projecting arm 50 of the hopper casting so that the clearing wheel may be adjusted toward and from the guide bars 40 and 42 to accommodate screws having heads of different sizes.

In order to facilitate free gravitational movement of the screws along the upper section of the guide chute, a percussive means or device 114 (Fig. 3) may be provided. This device may comprise a hammer or vibrator 116 slidably mounted in the sleeve 118 having attaching flange 120 fastened to the inner guide bar 42, the sleeve 118 carrying the pin 122 received in a slot 124 formed in the hammer 116 to limit the movement of the hammer. A coil spring 126 received in an opening in the hammer bears at one end against an upstanding wall 128 of the auxiliary base or body 12 or a bracket carried by this auxiliary base and urges the hammer toward the guide bar 42. The hammer is periodically moved away from the guide bar 42 to compress the spring 126 by a pulley 130 driven by the belt 108 and having axially projecting pins 132 having beveled ends engaging radially projecting pins 134 carried by the hammer 116. The percussive device 114 acts as a continuously operated hammer, periodically striking the inner guide bar 42 with sufficient force to cause a vibration of this guide bar or the screw blanks therein to facilitate the free movement of the blanks down the guide chute.

*The hopper and the feed mechanism for the washers*

Figure 14:
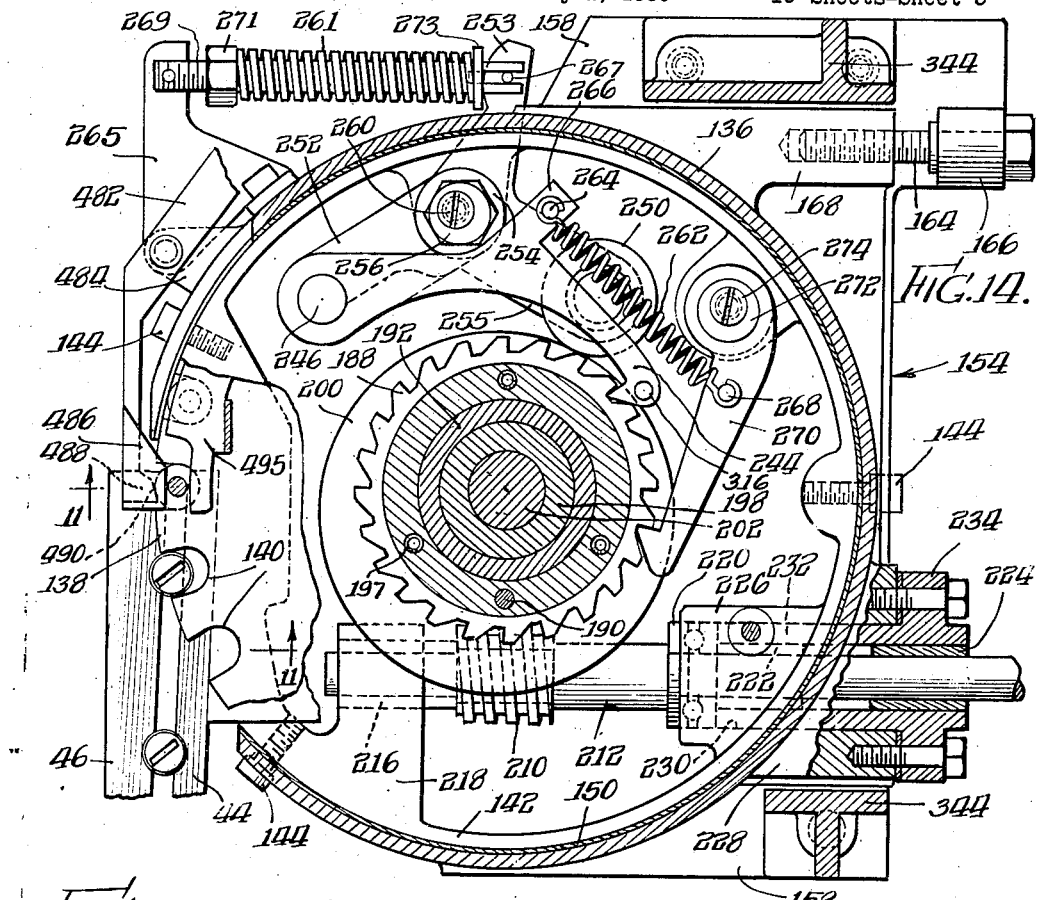
Fig. 14 is a section taken along the line 14—14 of Fig. 10.
Figure 15:
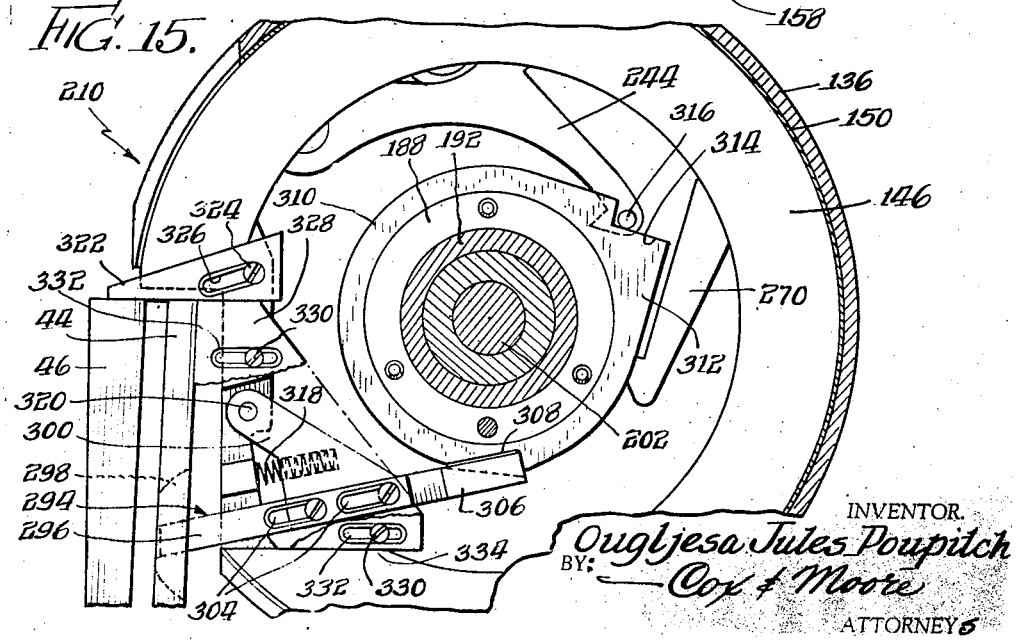
Fig. 15 is a fragmentary section taken along the line 15—15 of Fig. 10.

As shown in Figs. 1, 4, 6, and 10 to 20, the washer hopper comprises a tubular shell or casting 136, the bottom wall of which hopper is formed by a rotary disc 138 having a plurality of angularly spaced outwardly opening notches or recesses 140 extending radially with respect to the axis of the disc, and it should be noted that the hopper is positioned in juxtaposition to the guide chute 18 and that a portion of the shell 136 is cut away to permit the disc 138 to successively position washers on the lower section 38 of the guide chute relatively adjacent its upper end and in central alignment with the way or channel defined by the guide bars 44 and 46. The tubular shell 136 may be secured to a hollow, generally cylindrical member or housing 142 as by angularly spaced screws or bolts 144 (Fig. 14). A ring 146 having a hardened smooth upper surface rotatably supports the peripheral portion of the disc 138 and is secured in any convenient manner to the housing 142. It will be noted that the ring 146 extends beneath the washer receiving notches of the disc 138 so as to hold the washers in these notches as against downward movement and guide the washers during the rotation of the disc. The upper surface of the ring 146 lies in the same plane with the upper edges of the guide bars 44 and 46 of the lower section 38 of the guide chute and the ring is circumferentially relieved (Fig. 14) to receive the upper end portions of these guide bars 44 and 46 so that the disc 138 carries the washers from the surface of the ring onto the surface of the guide bars at their upper ends. A sleeve 150 having a hardened smooth inner surface is interposed between the housing 142, the ring 146, the disc 138 and the tubular shell 136 so as to facilitate the carrying of the washers around the inner wall of the washer hopper without wear or injury thereto as the disc is rotated.

The housing 142 is slidably mounted for adjustment toward and from the guide chute 18 on the shelf 152 (Figs. 1, 4, 6, 10, 14 and 21) of the bracket 154 which forms the common mounting means 8. The bottom end wall 156 of the housing 142 is supported upon the surface of the shelf 152 and is received between the upstanding guide flanges 158 of the shelf 152. Screws 160 threaded into the bottom wall 156 are received within the enlarged openings or slots 162 in the shelf 152 and retain the housing in adjusted position. An adjusting screw 164 carried by the upstanding lug or boss 166 formed on the shelf 152 is received in a threaded opening in an outwardly projecting lug or boss 168 formed upon the housing 142 so that upon manipulation of the screw, the housing and parts carried thereby may be moved toward and from the guide chute so that the center of the washers positioned at the upper end of the lower section of the guide chute will be aligned with the longitudinal center lines of both the upper and the lower sections of the guide chute.

The bracket 154 is supported upon the auxiliary base or body 12 by the depending reenforcing portion 170 of the shelf 152 bearing upon the shelf 66 of the auxiliary base or body 12 and is secured thereto as by screws 172, the bracket 154 having a depending portion 174 extending in overlapping relation to the outer vertical wall surface of the auxiliary base or body 12 and carrying adjustable set screw 176 bearing against this surface of the auxiliary base and secured in adjusted position as by clamping nut 178. Side flanges 180 of the depending portion 174 of the bracket provide reenforcing webs for the shelf portion 152 of the bracket. The bracket 154 is additionally provided with a rearwardly extending flange 182 (Fig. 6) overlapping an inwardly extending vertical wall surface 184 (Fig. 1) of the auxiliary base or body and to which rearwardly extending flange the bracket 60 supporting the lower ends of the guide bars 40 and 42 may be secured, as shown in Fig. 21.

The disc 138 is interposed between a collar 186 (Fig. 10) and a ratchet and index wheel 188, to which collar and ratchet the disc is secured for simultaneous rotation as by pins 190. The disc 138, the collar 186 and the ratchet 188 are journalled upon a sleeve 192 on which they are held against axial movement by an annular shoulder 194 of the sleeve and an adjustable collar 196 threaded on the upper end of the sleeve. Springs 197 received in angularly spaced openings in the surface of the ratchet, engage the disc 138 to raise the same from the ratchet whereby to facilitate removal of the disc upon removal of the collar 196. The sleeve 192 is in turn journalled upon the upper hub portion 198 of a cam 200 in turn journalled upon a fixed stud shaft 202. The stud shaft 202 is mounted in the boss 204 formed in the bottom wall 156 of the housing 142 and is secured thereto as by the set screw 206. The worm wheel 208 journalled on the stud shaft 202 is driven by a worm 210 keyed to a shaft 212, the worm wheel 208 being connected to the cam 200 by the key or splined connection 214. The shaft 212 is journalled by a sleeve 216 (Fig. 14) in the inwardly projecting boss 218 formed with or secured to the housing 142 and by an anti-friction roller bearing 220 and the bushings 222 and 224 in inwardly projecting boss 226 and in outwardly projecting boss 228 formed upon or secured to the housing 142. The shaft 212 with the worm 210 attached and the roller bearing 220 mounted thereon may be inserted into the housing through an opening 230 extending through the bosses 226 and 228. A sleeve 232 with the bushing 222 press-fitted thereto is then inserted into the opening 230, and this sleeve is formed with a plate 234 bolted to the boss 228 and into which plate is press-fitted the bushing 224. The shaft 212 is driven by an electric motor 236 (Fig. 1) mounted upon one of the flanges 180 and/or the flange 182 of the bracket 154. The motor is connected to the shaft 212 by a belt 238 passing about a pulley 240 secured to the motor shaft and a pulley 242 secured to the outer end of the shaft 212.

The ratchet wheel or index plate 188 is intermittently driven by a dog or pawl 244 (Fig. 14) journalled in one end on a pivot pin 246. The pin 246 is in turn pivotally received in one end of a lever 252, the hub portion 254 of which is journalled upon a cylindrical bearing member or sleeve 256 having an enlarged adjusting head of preferably hexagonal configuration. The bearing 258 is eccentrically bored to receive a threaded mounting stud 260 threaded into the bottom wall 156 of the housing and having an enlarged slotted head 262 to retain the bearing 258 against axial movement and to permit the bearing to be adjusted eccentrically about the axis of the stud 260 by applying a suitable tool to the adjusting head 258 of the bearing. The hub portion 254 of the lever 252 is also formed with angularly spaced arms 253 and 255, the arm 255 carrying a roller or cam follower 250 engaging the surface of the cam 200.

The roller or cam follower 250 is held in engagement with the surface of the cam 200 and the tooth of the pawl 244 is held in engagement with a tooth of the ratchet wheel or index plate 188 by an adjustable coil spring 261 bearing at one end against the end of the lever arm 253 and anchored at its other end to a bracket 265 secured to the housing 142. The lever arm 253 carries at its outer end a pin 267 received in the slotted end of a rod 269 pivoted to the bracket 265. The spring 261 embraces the rod 269 and is interposed between a nut 271 threaded on one end of the rod and a collar 273 slidably mounted on the rod and held by the spring in engagement with the lever arm 253.

A coil spring 262 is anchored at one end as by the pin 264 to a projecting lug 266 formed upon the pawl, the other end of the coil spring 262 being anchored as by a pin 268 to an indexing pawl or dog 270. The indexing pawl or dog 270 is pivotally mounted at one end upon the bearing 272 eccentrically bored to receive the threaded mounting stud 274 having an enlarged slotted head retaining the bearing member against axial movement and detachably securing the clamping member to the bottom wall 156 of the housing 142. The peripheral surface of the bearing member 272 beneath the pawl 270 may be provided with tool receiving notches or radial openings by which the bearing member may be rotated about the eccentric axis of the mounting stud so as to bring the tooth of the indexing pawl into proper mating relation with the teeth of the ratchet or index wheel 188.

The worm wheel 208 which drives the cam 200 also through this cam drives a second cam 276 (Fig. 10) which drives the assembly mechanism as will subsequently appear. The cam 276 is journalled on the upper end of the fixed stud shaft 202 and is held against axial movement on the stud shaft by resting at its lower surface upon the hub portion 198 of the cam 200 and the sleeve 192 and by a screw or bolt 278 having an annular flange 280 overlying the upper end of the stud shaft and the hub portion of the cam 276. The screw 278 is centrally bored as at 282 throughout its entire length to permit lubricant to be injected into the axial opening 284 in the stud shaft, which axial opening communicates with a diametrical opening 286 by which the lubricant passes to a radial opening 288 in the hub 198 of the sleeve and an axial surface groove 290 in the stud shaft by which last groove lubricant is supplied to the internal bearing surface of the worm wheel 208 and the cam 200. The radial opening 288 communicates with a surface groove 292 in the hub portion 198 of the cam 200, by which groove the lubricant is supplied to the external and internal bearing surfaces of the cam and the sleeve 192.

Means are provided in association with the washer feeding means for preventing operation of the latter if the lower section 38 of the guide chute becomes filled with assembled screw blank and washer units, or if said units become jammed in this lower section of the guide chute. This means for preventing operation of the washer feeding units comprises a sensing device 294 (Figs. 10, 11, 15 and 16) including a strip or bar 296 received in and passing through an opening 298 (Figs. 5, 11, 15 and 16) in the outer guide bar 44. The strip or bar 296 is adjustably mounted on a lever 300 as by screws 302 carried by the lever and received in elongated openings or slots 304 in the strip 296. The lever 300 is provided with an arm 306 forming in effect an extension of the strip 296 and seated within a circumferential notch or recess 308 in a pawl or dog controlling ring 310, the ring 310 being received in an annular groove in the hub portion of the ratchet or index wheel 188 and loosely journalled thereon. The under surface of the arm 306 of the lever 300 is cut away to clear the teeth of the ratchet 188. The ring 310 is formed with an outwardly extending portion 312 having a notch 314 in which sits a pin 316 secured to the outer toothed end of the dog or pawl 244. A coil spring 318 seated in an opening in the lever 300 and bearing at one end against the wall of the housing 142 normally urges the lever to the position shown in Fig. 15 wherein the arm 306 is seated in the notch 308 of the ring 310. Upon movement of the pawl 244 about the periphery of the ratchet in a clockwise direction under the action of the cam 200, the pin 316 causes the ring 310 to rotate in a clockwise direction, thereby causing the lever 300 and the strip 296 to rotate in a clockwise direction about the pivot pin 320 of the lever until the arm 306 clears the notch 308 and the tooth of the pawl 244 is positioned so that upon movement in the opposite direction about the periphery of the ratchet, it will engage a ratchet tooth and cause a counterclockwise feeding movement thereof. The strip 296 in moving clockwise about the pivot pin 320 moves through the opening 298 in the guide bar 44 and projects across the guide channel formed by this guide bar and the guide bar 46. If the lower section 38 of the guide chute is filled with assembled units, or if assembled units have become jammed in this section of the guide chute, the shank of a screw blank will project in the path of movement of the strip 296 and hence hold this strip against clockwise movement. The arm 306 of the lever 300 is thereby held in the notch 308 and the ring 310 is consequently held against movement. Accordingly when the pawl 244 is operated by the cam 200, the ring 310 will cause the tooth end of the pawl to move outwardly rather than peripherally of the ratchet so that it will not be positioned to engage the next tooth of the ratchet, but upon movement in the opposite direction will merely fall into the same tooth space it occupied previously and hence no feeding movement of the ratchet will take place when the shank of the screw blank prevents clockwise movement of the strip 296.

Adjustable means are provided for facilitating the movement of the washers from the surface of the ring 146 to the surface of the guide bars 44 and 46 and for facilitating the return of the washers from the upper surface of the guide bars to the upper surface of the ring if no screw blank is fed by the assembly mechanism into assembled relation with a washer at the upper ends of these guide bars. This means comprises a wedge 322 (Fig. 15) slidably mounted in a groove in the ring 146 so that the surface of the wedge lies flush with the surface of the ring and the surfaces of the guide bars 44 and 46 and this wedge is adjustably secured to an inwardly projecting portion of the wall of the tubular housing 142 as by a screw 324 secured to this inwardly projecting wall portion and received in an elongated slot 326 in the wedge 322. The wedge 322 provides readily adjustable means for supporting the washers as they move from the surface of the ring 146 to the surfaces of the guide bars 44 and 46 and compensate for the usual manufacturing tolerances. The wedge plate also facilitates an adjustment of the washer feeding mechanism to accommodate washers of different sizes, for as the external diameter of the washers increases, the housing 142 with the ring 146 and the disc 138 must be adjusted outwardly relative to the inner guide bar 46 as illustrated in Figs. 16 to 18. A plate 328 adjustably secured to an inwardly projecting portion of the tubular wall of the housing 142, as by screws 330 received in elongated slots 332 in this plate, abuts the outer edge of the guide bar 44 and the edge 334 of the ring 146 and lies above the lever 300 and the strip 296 with its upper surface flush with the upper surfaces of the bars 44 and 46 and the ring 146. This plate 328 provides readily adjustable means for facilitating the movement of washers from the upper surfaces of the guide bars to the surface of the ring 146 so that washers with which screws have not been assembled at the upper ends of the guide bars will be returned to the washer hopper.

It sometimes occurs that a washer in a notch 140 of the washer feed disc 138 becomes interlocked with another washer so that the two washers are fed together to the point of assembly, one washer being superimposed upon the other as shown in Fig. 13. There is accordingly provided means to prevent feeding of more than one washer at a time to the point of assembly and in the illustrative embodiment this means comprises a plurality of angularly spaced bars or wiper strips 336 (Figs. 4, 10, 16, 19 and 20). The wiper strips 336 are mounted upon an arcuate bar 338 fastened to the hopper shell 136 as by screws 340, the strips 336 extending downwardly at an angle in the direction of movement of the washer feeding disc 138 and terminating at their lower edges just above the surface of the disc so as to engage washers superimposed upon the washers in the notches 140 and break the superimposed washers loose from the washers in these notches. Clamping screws 342 by which these wiper strips are mounted upon the arcuate bar 338 cooperate with the bar 338 to frictionally hold the wiper strips against upward deflection. Preferably, the distances between the washer feeding disc and the lower edges of the wiper strips are graduated in the direction of movement of the disc, the first wiper strip being spaced the greatest distance from the surface of the disc and the last wiper strip being spaced the smallest distance so that the graduated force will be applied to the superimposed washers, the first wiper strip removing the more loosely held superimposed washers and the last wiper strip removing the most tightly held or interlocked washers from the washers properly positioned in the notches of the feeding disc. If desired, this graduated effect may be increased by more tightly clamping successive washer strips to the arcuate bar so that the first wiper strip may be more or less readily deflected while the last wiper strip is substantially undeflected by the superimposed washers.

The washer feeding means operates as follows: Washers are dumped into the hopper shell 136 upon the surface of the washer feeding disc which forms the bottom wall of the hopper, the washers gravitating to a predominant mass positioned against the forward and lower portion of the wall of the hopper shell. Washers from this mass fall into the notches 140 of the feeding disc and rest upon the surface of the ring 146 along which they are moved in interrupted or intermittent movement by the washer feeding disc and are carried in succession to the point of assembly at the upper ends of the guide bars 44 and 46 forming the lower section 38 of the guide chute 18. Interrupted or intermittent movement of the washer feeding disc is effected by the cam 200 and the spring 261. As the high point of the cam approaches the cam roller 250, the lever 252 is caused to move in a counterclockwise direction and the pawl 244 is moved against the action of the spring 261 in a direction to move freely about the ratchet 188 a distance of one ratchet tooth. As the high point of the cam recedes from the cam roller, the lever 252 and the pawl 244 are moved by the spring 261 in the opposite direction, the tooth of the pawl engaging a ratchet tooth and causing a counterclockwise movement of the ratchet a distance of one tooth. The index pawl 270 is so adjusted that it engages between adjacent teeth of the ratchet at the proper instant to position the feeding disc attached to the ratchet precisely at the point at which the center of a notch 140 of the disc is held at the point of assembly. If the lower section of the guide chute becomes substantially filled with assembled screw blank and washer units or if such units become jammed in this section of the guide chute, operation of the washer feeding means will be prevented as previously described. When the strip 296 again becomes free to move across the guide channel, operation of the washer feeding means is automatically resumed as will be apparent.

*The assembly mechanism*

As shown in Figs. 1, 4, 6, 21, 22 and 26 to 34, the assembly mechanism comprises a strap or bracket 344 of substantially inverted U-shape, detachably secured as by screws 346 to the flanges 158 of the casting 154 and a second bracket 348 is mounted on the bracket 344 for adjustment toward and from the guide chute 18, the bracket 348 being secured to the strap 344 as by a screw 350 carried by the strap and received in an enlarged opening or slot in the base of the bracket 348. An assembly head 352 is carried by the outer tubular end portion 354 of a casting or bracket 356 having arms 358 diverging from the tubular portion 354 and terminating in parallel arm portions 360 embracing the bracket 348 and mounted thereon by a pin or rod 362 fastened to spaced upstanding arms of the bracket 348. The casting 356 is additionally secured to the bracket 348 as by a bolt 364 (Figs. 21 and 22) threaded into the bracket and passing through the web 366 of the casting 356.

The assembly head 352 comprises a tube or sleeve 368 (Figs. 6, 26, 33 and 34) slidably mounted in the tubular portion 354 of the head carrying casting 356 and embracing a slide rod or plunger 370 relatively slidable within the sleeve 368. The plunger 370 is provided with a reduced upper portion or rod 372 formed integrally with or secured to the plunger. The rod 372 passes through a cap nut 374 received on the threaded upper end of the tube 368, the rod 372 carrying at its upper end adjustable movement limiting and clamping nuts 376 and 378 and the nut 378 in the upper position of the assembly head is spaced a predetermined distance above the cap nut 374. Below the cap nut 374 the tube 368 carries an adjustable movement limiting and clamping nut or sleeve 380 which is adapted upon the downward movement of the assembly head to engage a washer 382 encircling the tube 368 and positioned upon a cap nut 384 carried by the upper end of the tubular portion 354 and clamped in adjusted position by the nut or threaded sleeve 386. A coil spring 388 embraces the rod 372 and is housed within the upper portion of the tube 368, the spring 388 being interposed between the enlarged portion or head of the plunger 370 and the cap nut 374. Upward movement of the tube 368 relative to the tubular portion 354 is limited by the engagement of an end of the shoulder 390 of the tube with the cap nut 384. Adjacent its lower portion the tube 368 is provided with an internal thread mating with an external thread of a sleeve or tubular member 392 (Figs. 26, 28, 33 and 34). The sleeve or tubular member is provided with diametrically disposed axially extending slots or grooves 394 for receiving the shank portions 396 of jaw members 398.

The jaw members 398 are provided at their lower ends with jaws 400 adapted to support the heads of the screw blanks successively fed to the jaw members and having notches 402 for receiving and clamping the shanks of the screw blanks to the jaw members. As will be seen from Fig. 29, the shape of the notches 402 is such that the outer edges 404 of the jaws are spaced apart a lesser distance than the inner edges 406 of the jaws so that when the inner edges are spaced apart sufficiently to permit the shank of a screw blank to pass therebetween, the edges 404 are spaced apart a distance less than the diameter of the screw shank and prevent the screw from falling through the jaws from the upper section of the guide chute. Each jaw member 398 is fulcrumed on the sleeve 392 by a protuberance 408 of circular configuration received in a notch 410 extending inwardly from the bottom of the slot 394. The jaw members are held in assembled position with the sleeve 392 by a coiled band spring 412 embracing the sleeve and the jaw members and seated in notches 414 at the upper ends of the jaw members.

A sleeve 416 which determines the opening movement of the jaw members as the assembly head approaches its upper limit of movement is secured to the fixed tubular portion 354 for micrometric adjustment relative thereto by opposed set screws 418 and 420 having frusto-conical end portions received in frusto-conical openings or notches 422 and 424 respectively in the surface of the sleeve 416. The internal surface of the sleeve 416 at its lower end is tapered outwardly as at 426 and is adapted to engage the outer edge of the head portion 428 of each jaw member so that as the assembly head approaches its upward limit of movement, the tapered surface 426 of the sleeve 416 in engaging the heads 428 of the jaw members cause the jaw members to fulcrum relative to the sleeve 392 about the protuberances 408 and thereby move the jaws apart a predetermined distance to the proper position to receive the foremost screw blank from the upper section 36 of the guide chute 18. The jaw members 398 are moved to closed position by a coil spring 430 embracing the lower portion of the sleeve 392 and a sleeve 432 slidably mounted on the sleeve 392 and interposed between an annular flange 434 of the sleeve 392 and an annular flange 436 formed at the bottom of the sleeve 432, the annular flange 436 bearing upon the upper edges of the heads 428 of the jaw members 398 outwardly of the fulcruming protuberances 408 so that the jaw members are maintained in engagement with the tapered surface 426 of the fixed sleeve 416 and are urged toward each other to clamp the screw blank between the jaws 400. The jaw members 398 are moved to full open position as the assembly head approaches its lower limit of movement by an adjustable stop provided by an annular internal shoulder 438 formed in an externally threaded sleeve 440 received by the internally threaded lower portion of the tubular portion 354 of the head supporting casting 356. The heads 428 of the jaw members are provided with outwardly extending lugs or the like 442 which preferably are formed with convex outer edges slidably contacting the internal wall of the sleeve 440 above the shoulder 438. As the assembly head approaches its lower limit of movement, the heads 428 of the jaw members engage the shoulder 438 and consequently as the sleeve 392 of the assembly head continues its downward movement, the jaw members are rotated oppositely to full open position, releasing the shank of the screw element and permitting the head thereof to pass downwardly between the jaws 400.

The sleeve 440 at its lower end is formed with an annular shoulder 444 having a knurled periphery and angularly spaced radial openings 446 to facilitate adjustment of the sleeve relative to the tubular portion 354 of the support casting. The cap nuts 374 and 384 as well as the clamping nuts or collars 380 and 386 are similarly provided with a knurled periphery and similar angularly spaced radial tool receiving openings for facilitating adjustment of these devices. A similar clamping nut or collar 448 maintains the sleeve 440 in adjusted position.

The plunger 370 is slidably received in an enlarged bore in the upper portion of the sleeve 392 and is provided with a plunger rod 450 of a reduced diameter slidably received in the reduced bore of the lower portion of the sleeve 392. The rod 450 extends substantially below the sleeve 392 and in the upper position of the assembly head is spaced a slight distance above the head of the screw resting upon the jaws 400. The distance between this rod and the head of the screw resting on the jaws 400 is substantially equal to the distance between the nut 378 on the rod 372 and the cap nut 374 when the assembly head is in its upper limit of movement.

The assembly head is operated by the previously mentioned cam 276 mounted on the upper end of the stationary shaft 202 of the washer feeding means, the cam 276 being driven by the cam 200 to the hub of which the cam 276 is splined as indicated by the dotted lines in Fig. 10. The cam 276 is formed with an upper cam surface having two active portions, one of which raises a plunger rod 452, and the other of which permits lowering of the plunger rod, and two dwell portions, one of which maintains the plunger in its upper position for a given period, and the other of which allows the plunger to remain in its lower position for another given period.

The plunger 452 is slidably mounted in a bushing 454 (Fig. 22) formed with the shelf portion 456 of the head supporting casting 356. A lever 458 pivotally mounted on the pin 362 carried by the bracket 348 is raised by the plunger 452 through an adjustable set screw 460 secured in adjusted position by clamping nut 462 and is lowered by a coil spring 464 anchored at one end to a pin 466 carried by an arm 358 of the head supporting casting 356 and at its other end the spring is anchored to a pin 468 projecting inwardly in a tube 470 press-fitted or otherwise secured at its lower end to the lever 458. The tube 470 permits the use of a relatively large spring 464 notwithstanding the relatively close position of the lever with respect to the casting 356. A ball headed pin 472 (Figs. 26, 33 and 34) is press-fitted into the free end of the lever 458 and is seated in a slot 474 in the enlarged portion of the rod or plunger 370. The head 476 of the pin 472 may be formed with flat side surfaces and the slot 474 may therefore take a rectangular configuration. The pin 472 passes through relatively elongated slots 478 and 480 in the tubular portion 354 of the head supporting casting 356 and the tube or sleeve 368 respectively.

The assembly mechanism operates as follows: The cam 200 of the washer feeding means is driven in a clockwise direction (Fig. 14) to effect, through the spring 261, interrupted or intermittent movements of the washer feeding disc 138 in a counterclockwise direction, each revolution of the cam 200 effecting movement of the washer feeding disc an angular distance corresponding to the distance between successive washer receiving notches. For each revolution of the cam 200, the cam 276 also makes a single revolution, and since the assembly head must necessarily make one complete cycle of movement for each revolution of the cam 276, the head therefore completes one cycle of movement for each interrupted movement of the washer feeding disc. The washer feeding disc having positioned a washer at the upper ends of the guide bars forming the lower section of the guide chute and holding the washers stationary on these guide bars, the plunger 452 is permitted by the cam 276 to move to its lower position so that the spring 464 carries the lever 458 with its ball headed pin 472 to its lower position. In moving from its upper to its lower position, this lever 458 by means of the pin 472 first causes the plunger 370 to move downwardly a limited distance relative to the tube 368 until the nut 378 engages the cap nut 374. When this occurs the plunger rod 450 engages the head of a screw positioned on the jaws 400 of the jaw members 398 and therefore holds the screw blank against shifting or tilting with respect to the jaws. The nut 378 having contacted the cap nut 374, the tube 368 thereafter moves downwardly with the plunger 370 and consequently the jaw members 398 also move downwardly with the plunger. In the preliminary portion of the downward movement of these jaw members, their heads 428 move along the internal tapered surface 426 of the sleeve 416 and the coil spring 430 accordingly moves these jaw members toward each other so that the shank of the screw blank is clamped in the notches 402 of the jaws 400. As the lever 458 approaches its lower limit of movement, the heads 428 of the jaw members engage the annular shoulder 438 of the tube 440 and as the plunger rod 370 and the tube 368 continue their downward movement, the jaw members are rotated by this shoulder in opposite directions to full open position as shown in Fig 31, the shank of the screw blank having meanwhile been inserted through the aperture in the washer positioned at the upper end of the guide bars 44 and 46. This opening movement of the jaw members may be so proportioned that in its continued downward movement the plunger 370 forces the head of the screw blank into closer juxtaposition to the upper surface of the washer after the head of a screw blank has been released by the jaws 400 as shown in Fig. 34. The screw blank having been assembled with the washer, the cam 276 causes a raising of the plunger 452 thereby to move the lever in an upward direction and tension the spring 464. It is during the consequent upward movement of the assembly head or during the time when the assembly head is resting in its upper position that the washer feeding disc is moved to carry the assembled screw blank and washer from the point of assembly and to position another washer at the point of assembly. The plunger rod 370 moves upwardly with the lever 458 and the upward movement of the plunger is transmitted to the tube 368 through the spring 388. As the heads 428 of the jaw members 398 move away from the shoulder 438, they are moved to closed position by the spring 430. As the tube 368 approaches its upper limit of movement, as determined by the engagement of the shoulder 390 with the cap nut 384, the heads 428 of the jaw members engage the internal tapered surface 426 of the sleeve 416 and are accordingly moved partially to open position to receive the next foremost screw blank from the lower end of the upper section 36 of the guide chute 18. The tube 368 completes its upward movement just before the lever 458 reaches its upper position as determined by the cam 276 and the adjustable set screw 460 and accordingly the plunger 370 continues to move a limited distance relative to the tube 368 so as to clear the head of the screw blank to permit free gravitational movement of the screw blank to position between the jaws 400.

Means are provided in cooperative association with the assembly mechanism and the washer feeding means for preventing the feeding of a screw blank if a washer has not been positioned at the point of assembly, that is, if a notch 140 arriving at the point of assembly does not enclose a washer. This means comprises a lever 482 pivoted intermediate its ends to a lug or bracket 484 formed on or secured to the wall of the tubular housing 142. The lever 482 is formed at its outer end with a plate-like portion 486 lying in a plane above the plane of the washer feeding disc 138 (Figs. 11 and 12) and carries on its lower surface a pivoted cam-like lug or finger 488 lying in the plane of the washer feeding disc, the beveled edge 490 being spaced inwardly of the outer edge 492 of the plate-like portion 486. The lever is urged in a counterclockwise direction (Figs. 16 to 18) by a coil spring 494 seated at one end in an appropriate opening not shown in the wall of the tubular housing 142 and seated at its other end in an opening 496 in an end of the lever 482. Counterclockwise movement of the lever may be limited by engagement of the lever with the wall of the hopper shell 136 or the wall of the tubular housing 142. When a washer is positioned at the point of assembly in a notch 140 of the washer feeding disc, the beveled edge 490 of the lug or piece 488 engages the periphery of a washer and maintains the plate-like portion 486 out of the path of movement of the shank of a screw blank being fed downwardly by the assembly head, as shown in Fig. 11. However, if no washer is positioned at the point of assembly during the downward feeding movement of the assembly head, the plate-like portion 486 is free to move inwardly relative to the notch of the feeding disc and is then positioned in the path of movement of a screw blank being fed downwardly by the assembly head and therefore by engaging the screw blank at its lower edge, prevents further downward feeding of the screw blank and prevents positioning of the blank in the lower section of the guide chute, as shown in Fig. 12. Since this plate-like portion 486 is engaged by the screw blank before the jaw members 398 have moved downwardly sufficiently to engage the angular shoulder 438 of the tube 440, the screw blank remains clamped to these jaw members and hence when the plunger 452 is subsequently moved upwardly by the cam 276, the screw blank is carried upwardly with the assembly head. It should also be noted that although when the assembly head approaches its upper limit of movement, the jaw members 398 are open, such opening movement is partial only and not sufficient to release the screw blank. Hence the screw blank remains in the jaw members until a washer is properly positioned at the point of assembly and the screw blank may then be inserted thereinto. Such stoppage of the assembly head without stoppage of the driving cam 276 is of course permitted by the spring 264.

A spring strip 495 is secured to the lower edge of the guide bar 40 and extends in overlying contacting relation with the washer feed disc 138 so as to partially overlie a washer at the assembly point oppositely to the plate-like portion 486 of the washer sensing device and thereby prevent tilting of the washer under the pressure of the spring 494, acting through the lug or piece 488. The strip 495 also extends over a portion of the feed disc in advance of the assembly point and therefore engages improperly seated washers and moves them into proper seating positions in the notches 140.

*The thread rolling mechanism, the transfer mechanism, and the starter mechanism*

These mechanisms which form part of a standard thread rolling machine are conventional in structure and therefore it suffices to note briefly that the fixed die 20 of the thread rolling mechanism is detachably clamped to a supporting block 498 adjustably mounted on an upstanding arm 500 of the auxiliary base or body 12, and that its upper transverse edge forms with the upper transverse edge of the block 498 and the lower edge of the cover plate 62 of the starter mechanism and a slide bar guide (not shown) of the starter mechanism to form an inclined chute 502 along which the assembled screw blank and washer units are transferred from the lower end of the lower section 38 of the guide chute 18 to the thread rolling mechanism. The reciprocating die 22 of the thread rolling mechanism is detachably clamped to a reciprocating bar 504 slidable in a suitable guide 506 and operated by a pitman 508 (Fig. 6) intermittently driven by the usual suitable driving mechanism of the thread rolling machine. The starter mechanism 24 comprises a slide bar 510 (Figs. 4, 6 and 8) having at its forward end a starter finger 512 for engaging the shank of the screw blank positioned between the upper end of the die 20 and the lower end of the die 22 so that upon forward movement of the starter bar 510, the screw blank will be firmly forced into engagement with the thread rolling surfaces of the dies 20 and 22. The starter bar 24 is reciprocated in timed relation to the die 22 by the usual or suitable driving mechanism of the thread rolling machine. The transfer mechanism 26 comprises a reciprocating member 514 moved in an outward direction by any suitable mechanism such as a cam 516 engaging the cam roller 518 operatively connected to the reciprocating member 514 and moved inwardly by the coil spring 520. The reciprocating member 514 carries an adjustable transfer finger 522 which engages the shank of the screw blank positioned at the intersection of the chutes 18 and 502 and in the inward movement of the member 514 carries the assembled screw blanks and washer units to the thread rolling dies. A thin strip 524 may be secured to the lower end of the outer guide bar 44 and extend over the outer end of the guide chute 502 so as to facilitate movement of the assembled screw blank and washer units from the chute 18 to the chute 502, the strip 524 lying flush with the upper surface of the bar 44.

Operation of the machine

The operation of the machine will be apparent from the description heretofore given of the construction and operation of the several mechanisms. It suffices therefore to set forth briefly the cooperative functioning of these several mechanisms. In the operation of the machine shown in Figs. 1 to 34, screw blanks are fed from the hopper 14 by the reciprocating plate 94 to the upper section 36 of the inclined guide chute 18. The continuously operating clearing wheel 104 controls the passage of the screws down the guide chute as previously described. From the lower end of the upper section 36 of the guide chute, the screw blanks are gravitationally fed in individual succession into the jaws 400 of the jaw members 398 which when the assembly head is in its upper limit of movement, are positioned just slightly below the plane of the upper edges of the guide bars 42. Upon downward movement of the assembly head, a screw blank is carried downwardly in a path extending at right angles to the two sections of the guide chute so that the shank of the screw blank is inserted in the central aperture of a lock washer positioned on the upper end of the lower section 38 of the guide chute and held against movement by the washer feeding disc 138 during insertion of the shank of the screw blank therethrough. After the washer and screw blank have been brought into telescoping assembled relation, as shown in Fig. 24, the washer feeding disc advances the assembled unit along the lower section of the guide chute and the shank of the screw blank in engaging the inner vertical wall surface of the outer guide bar 44 effects the withdrawal of the assembled screw blank and washer unit from the feeding disc 138. These assembled units then gravitate down the lower section 38 of the guide chute in succession to the transverse chute 502 along which the washers are carried or pushed by the transfer mechanism 26 into the thread rolling dies 20 and 22, the lock washer resting upon the upper surface of the dies and bridging the space therebetween, so that the dies roll a thread upon the shank of a screw blank beneath the washer, and in the process of formation the surface material of the blank is projected outwardly and the external diameter of the thread of the finished screw is greater than the diameter of the shank of the original blank as shown in Fig. 25, whereby the thread permanently retains the lock washer in assembled relation with the screw. If the lower guide chute becomes filled with assembled screw blank and washer units or if such units become jammed in this lower section of the guide chute, operation of the washer feeding means is prevented. An assembled screw blank and washer unit is of course held at the point of assembly when operation of the washer feeding means is prevented and therefore upon the next succeeding downward movement of the assembly head, the head of the screw blank at this assembly point engages the lower end of a screw blank carried downwardly by the assembly head so that feeding of additional screw blanks is also prevented.

If a washer is not carried to the point of assembly, a washer sensing device or lever 482 operates as previously described to prevent feeding of a screw blank.

Adjustment of the machine

A number of adjustments are provided so that the combined washer hopper and washer feeding mechanism 2 and the assembly mechanism 4 may be readily attached to the thread rolling machine and adjusted for proper operative interrelationship, and to accommodate within certain practical limits different sizes of screw blanks and washers.

The bars 40 and 42 forming the upper section 36 of the guide chute 18 may be adjusted toward and from each other so as to be spaced apart the proper distance required by the shank diameter of the screw blanks by first adjusting the block 30 with the attached hopper casting 28 relative to the block 32, the guide bars 40 and 42 being moved simultaneously with the hopper casting 28. The carrying plate 52 (Fig. 2) for the guide bar 42 is then adjusted by a manipulation of the screw 56 to position this guide bar the proper distance from the guide bar 40. Simultaneous longitudinal adjustment of the upper section of the guide chute relative to the lower section, the assembly mechanism and the washer feeding means is effected by manipulation of the adjusting screw 526 (Fig. 1) by which the casting 32 is moved along the inclined surface of the casting 34 and vertical adjustment of the upper section of the guide chute is accomplished by manipulation of the adjusting screw 528 by which the casting 34 is adjusted with respect to the main base or body 10, the adjusting screws 526 and 528 being provided with the conventional thread rolling machine.

The inner guide bar 46 of the lower section 38 of the guide chute may be adjusted longitudinally upon release of the clamping screw 68 by moving the bracket 64 along the shelf 66 of the auxiliary base or body 12. The outer guide bar 44 of this lower section of the guide chute may be adjusted relatively toward and from the guide bar 46 upon release of the clamping screw 76 (Fig. 8) by moving the wedge 72 longitudinally in the proper direction and the necessary amount to secure the desired spacing between the bars 44 and 46 as determined by the diameter of the shank of the screw blanks to be assembled.

Adjustment of each cover plate or bar 78 for the guide chute to accommodate screw blanks having heads of different sizes may be accomplished upon release of the clamping nut 92 by rotating the pin 84 so that the eccentric portion 88 of the pin raises or lowers the bar 78 to the proper distance from the upper surface of the guide bars.

Adjustment of the washer feeding disc 138 toward and from the guide chute so that the centers of the washers and notches 140 will, at the assembly point, lie in the center of the space between the guide bars 44 and 46 is accomplished upon release of the clamping screws 160 by manipulation of the adjusting screw 164 which moves the housing 142 toward and from the guide chute along the shelf 152 of the common mounting means 8. The washer feeding disc 138 may accommodate washers of a limited range of sizes by substitution of a feeding disc 138 without however replacing any part of the driving mechanism for this disc, adjustment of the washer feeding means relative to the guide chute and adjustment of the assembly mechanism of course being required. The washers which are not within this limited range of sizes will require the replacement of the washer feeding disc by a similar disc having a greater or lesser number of notches 140. Since in the case of washers of smaller sizes, the number of notches 140 may advantageously be increased as shown in Fig. 17, the ratchet or index wheel 188 must also be replaced, for the ratchet must have one tooth for each notch in the disc 138. In the case of washers of greater size, requiring that the disc 138 have larger notches, the permissible number of notches is necessarily decreased and hence the substituted washer feeding disc must have a smaller number of larger notches, and hence a ratchet 188 having a smaller number of teeth must also be substituted. This substitution or replacement of the washer feeding disc 138 and the ratchet 188 may be readily accomplished by first removing the screw 278, after which the cam 276 may be readily removed, the nut or collar 196 removed, the disc and ratchet removed from the sleeve 192 and a replacement unit substituted therefor. In the case of the larger size washers such as shown in Fig. 18, it may also be necessary to substitute a washer sensing device or lever 482 having a larger plate-like portion 486. For washers differing in size more than a certain amount from a "median" or "usual" size, it may be found desirable to replace the cam 200 by a cam having a high point of greater or lesser diameter so as to obtain a greater or lesser pawl throw than can be obtained by adjustment of the sleeve 256 about the eccentric axis of the stud 260. Replacement of the cam 200 may readily be accomplished when the disc and ratchet have been removed by merely sliding the cam and the bushing 192 off the upper end of the fixed shaft 202 and inserting the substituted cam thereon, with which cam another bushing 192 may be associated.

Adjustment of the index pawl 270 may be readily accomplished by rotating the sleeve 272 about the eccentric axis of the stud 274. Substitution of pawls 244 and 270 may be required upon replacement of the ratchet 188 for the accommodation of the washers of sizes differing more than a certain amount from the "usual" size. These substitutions may be readily effected upon release of the screw headed mounting studs 260 and 274.

Adjustment of the wedge 322 and the plate 328 (Figs. 15 and 16) as may be required is readily accomplished in a manner obvious from these figures of the drawings.

Adjustment of the assembly head relative to the washer feeding means and to the guide chute so that the jaw members properly insert the screw blanks and washers and are properly aligned with the upper and lower sections of the guide chute at the limits of movement of the assembly head 352, may be accomplished by releasing the clamping screw 350 (Figs. 21 and 22) and sliding the head supporting casting 356 inwardly or outwardly with respect to the supporting strap or bracket 344. It will be apparent that upon adjustment of the housing 142 of the washer feeding means, the assembly mechanism will be simultaneously adjusted with respect to the guide chute. However, adjustment of the assembly mechanism radially relative to the washer feeding disc is necessary not only upon installation of the attachment, but also for the accommodation of different sized washers, for as the external diameters of the washers increase, the distance between the center of a washer in a notch 140 and the center of the disc becomes less, and hence as the washer feeding means is adjusted to accommodate washers of different external diameters, the assembly head must be adjusted relatively toward and from the axis of the washer feed disc. It should be noted in this connection that in order to permit such relative adjustment of the assembly head, the cam 276 is provided with a plunger engaging cam surface which in every section taken radially of the cam extends parallel to the plane of adjustment of the bracket 348 relative to the strap 344.

The set screw 460 provides readily adjustable means for varying the upper limit of movement of the plunger rod 370 of the assembly head so that in this upper limit of movement the rod 450 will properly clear the head of a screw blank moving into the jaw members 398. Also the screw 460 allows the plunger rod to be adjusted to accommodate screw blanks having heads of different depths or thicknesses.

The extent to which the jaw members are moved as the assembly head approaches its upper limit of movement may be micrometrically adjusted by loosening one of the set screws 418—420 and rotating the other set screw so as to move the sleeve or tube 416 upwardly or downwardly relative to the tubular portion 354 of the head supporting casting 356. The adjustment having been accomplished, the loosened screw is then of course tightened to maintain the sleeve in its adjusted position. This adjustment insures that the jaws 400 in their partially opened position when the assembly head is in its uppermost position, are spaced apart properly to permit the shank of the screw blank to pass between the edges 406 of the jaws and the edges 404 are spaced apart a lesser distance to prevent the screw blank from passing through the jaws. The vertical adjustment of the sleeve 416 determines the position of the tapering surface 426 relative to the heads 428 of the jaw members and of course determines the extent to which the jaws are opened when the assembly head is in its uppermost position. Adjustment of the degree of opening movement of the jaw members as the assembly head approaches its lower limit of movement is readily effected upon release of the clamping nut or collar 448 by a simple rotary adjustment of the tube 440 so that the tube is moved axially with respect to the tubular portion 354 of the head supporting casting and the stop shoulder 438 raised or lowered. The lower the stop shoulder, the smaller will be the opening movement of the jaw members and the higher the stop shoulder, the greater will be the opening movement of the jaw members so that by this means a proper movement of the jaws to release the heads of the screw blanks is assured, and accommodation offered for screws having heads of different diameters.

Adjustment of the tube or sleeve 368 relative to the tubular portion 354 of the head supporting casting 356 to bring the surfaces of the jaws 400 just below the plane of the upper edges of the guide bars 40 and 42 is effected by a manipulation of the cap nut 384 to raise or lower the tube 368 in the tubular portion 354.

Adjustment of the position of the assembly head in its lower limit of movement to position the jaws just above a washer in the washer feeding disc at the point of assembly is readily effected by adjustment of the nut or collar 380 axially of the tube 368, for it is this nut which in cooperation with the washer 382 determines the lower limit of movement of the assembly head. The distance which the plunger rod 370 initially moves downwardly relative to the tube 368 is determined by the adjustment of the nut 378, which is adjusted so that the plunger part 450 presses upon the head of the screw blank at the same time that the nut 378 engages the cap nut 374. As the thickness or depth of the screw blank to be assembled varies, so the nut 378 must be adjusted to allow the proper relative movement between the plunger and the tube 368.

Figure 35:
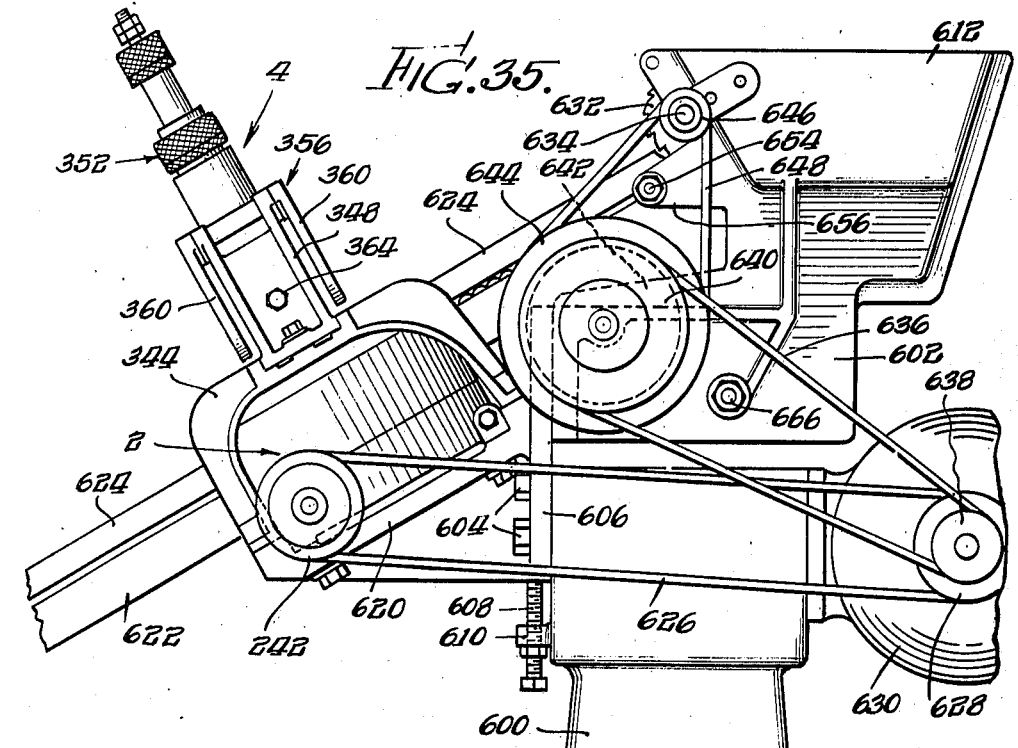
Fig. 35 is a view in vertical elevation of a mechanism or machine embodying in addition to the combined washer feeding and assembly mechanism of Figs. 1 to 34 a screw feeding mechanism upon a common support.
Figure 36:
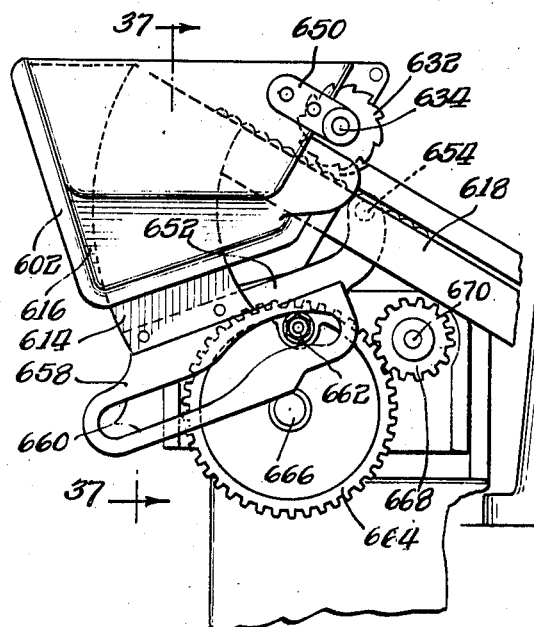
Fig. 36 is a fragmentary view in vertical elevation of the opposite side of the machine from that shown in Fig. 35.

Modification of Figs. 35 and 36

Figure 37:
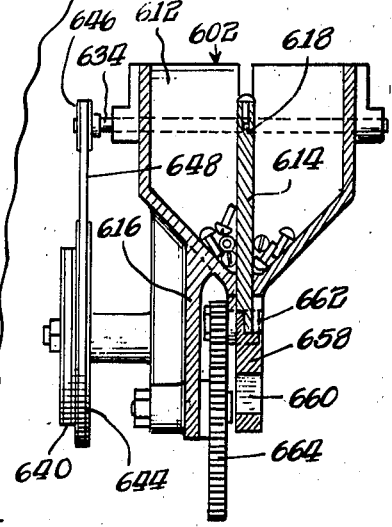
Fig. 37 is a section taken substantially along the line 37—37 of Fig. 36.

Although in a number or in the majority of cases the screw blank feeding mechanism of a standard or existing machine may be used in conjunction with the washer feed and assembly attachment shown in Figs. 1 to 34, in some cases this may not be possible or desirable. Accordingly the invention contemplates the provision of an auxiliary machine embodying as a part thereof a screw blank feeding mechanism, which auxiliary machine may be positioned to feed from its discharge chute the assembled screw blanks and washer units to the screw blank feeding means of the thread forming machine with which the auxiliary machine may desirably be associated. As shown in Figs. 35 to 37, this auxiliary machine may comprise a base or pedestal 600 having mounted thereon a hopper casting 602, the hopper casting being secured to the pedestal for vertical adjustment as by bolts 604 threaded into the pedestal and passing through enlarged openings in the depending portion 606 of the hopper casting and the casting is adjustable vertically by a set screw 608 carried by a lug 610 projecting from the pedestal 600. The hopper casting 602 is formed to provide a chamber 612 receiving a mass of screw blanks, the chamber having a slotted bottom wall to permit movement of an arcuate slide bar 614, which has a longitudinal screw receiving recess in its upper edge, through the mass of screw blanks in the hopper chamber. The arcuate slide bar 614 is guided in an appropriately formed slot in the lower portion 616 of the hopper casting. The spaced guide bars forming the upper section 618 of a guide chute are secured to the hopper casting 602 and project into the hopper chamber 612 so as to receive from the upper edge of the slide bar 614 any screw blank which is properly positioned to gravitate into the channel provided by these guide bars. One of the guide bars is fixed to the hopper casting while the other guide bar may be adjustably secured thereto as shown in Figs. 2 or 5, 8 and 9. The combined washer hopper and washer feeding means 2 which may be of a construction shown in Figs. 1 to 34 are mounted upon a common bracket 620 secured to or formed integrally with the hopper casting 602, the bracket 620 providing a mounting shelf similar to the shelf 152 of the bracket 154 and the combined washer hopper, washer feeding means and assembly mechanism being adjustably mounted therein as shown in Figs. 1 to 34. The bracket 620 also adjustably supports a pair of guide bars forming the lower section 622 of the guide chute in any convenient manner, as for example by an auxiliary bracket similar to the bracket 64 (Figs. 6 and 8) to which the guide bars may be similarly secured. The upper and lower sections 618 and 622 of the guide chute may be similar in all respects to the upper and lower sections 36 and 38 of the guide chute 18 and are similarly provided with cover plates or bars 624 adjustably secured to the sections 618 and 622 in the manner shown in Figs. 5 and 8. The driving pulley 242 of the washer feed means is driven by a belt 626 passing about a pulley 628 driven by a motor 630 mounted on the upper portion of the pedestal 600. A clearing wheel 632 similar to the wheel 104 (Fig. 1) is mounted on a shaft 634 and is positioned to overlie the upper section of the guide chute so as to prevent improperly positioned washers from moving down the guide chute. The clearing wheel 632 is driven by the motor 630 through a belt 636 passing about a pulley 638 on the motor shaft and a pulley 640 secured to a shaft journalled in the forwardly projecting portion 642 of the hopper casting. This same shaft carries a pulley 644 connected to a pulley 646 on the shaft 634 by the belt 648. The shaft 634 is mounted on a strap or straps 650 fastened to the hopper casting.

The arcuate slide bar 614 is secured to the outer end of a lever 652 pivoted as by the stud 654 to the forwardly projecting arm 656 of the hopper casting. The arcuate slide bar is also secured to an operating bar 658 having a slot 660 in which is received a roller 662 fastened to the face of a gear 664. The gear 664 is journalled on a shaft 666 carried by the lower portion of the hopper casting and the gear is driven by an intermeshing gear 668 secured to the shaft 670 on which the pulleys 640 and 644 are secured.

The operation of this auxiliary machine is similar to the operation of the screw blank feeding means, the combined washer hopper and washer feeding means and the assembly mechanism of Figs. 1 to 34 and need not be repeated. Adjustments of the several mechanisms are accomplished in a similar manner as previously described.

It will be evident that this auxiliary machine shown in Figs. 35 to 37 may be positioned with respect to any thread forming machine with which it may desirably be associated so that the assembled screw blank and washer units discharged from the auxiliary machine along the lower section 622 of the guide chute may be received in the screw blank feeding or conveying means of that thread forming machine and hence such auxiliary machine may readily be associated with any existing machine having means for conveying screw blanks into thread forming or thread rolling dies.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. An auxiliary mechanism or attachment for a machine having screw element feeding means, said mechanism or attachment comprising a washer container, a movable device receiving screw elements from the screw element feeding means and assembling screw elements with washers, a rotary member associated with the washer container for feeding washers to a position in the path of movement of a screw element received by said device, means for operating said device including a rotary operating member co-axial with said rotary member and means for rotating said co-axial rotary members in proper timed relation.

2. In a device for assembling screw and washer elements a mechanism receiving screw elements to be assembled, said mechanism including a reciprocable member carrying means for holding a screw element on the member during its operation, a washer container, a rotary member associated with the container for feeding washers to a position in the path of movement of the screw elements held to said reciprocable member, means for operating said reciprocable member including a rotary element co-axial with said rotary member, means for driving said rotary element and said rotary member about their common axis, means actuating said holding means upon telescoping of the screw element with the washer to release the screw element from the reciprocating member.

3. In a device for assembling screw and washer elements, a washer container, washer feeding means including a rotary disc, said disc having openings therein to receive said washers whereby said washers are carried by the disc to a predetermined point, means for feeding screw elements into telescoped relation with washers at said predetermined point, said means comprising a member movable along a path transverse to the plane of said disc, means for driving said member including a rotary element co-axial with the rotary disc, and common means for driving said disc and said rotary element.

4. In a mechanism for assembling screws and washers, a washer hopper having a rotary disc forming a wall portion of the hopper for carrying said washers from a mass in the hopper to a predetermined point, a pair of screw receiving jaws shiftable in unison to carry and insert screw elements into the washers at said predetermined point, means for driving said disc and shifting said jaws in proper timed relation, said means comprising a ratchet and pawl means operatively connected to the disc and a pair of driving cams rotating about the axis of the disc, one of the cams being operatively connected to the ratchet and pawl means to control the operation thereof and the other of which is operatively connected to said jaws to control the shifting of the jaws.

5. In a device for assembling screw and washer elements a reciprocating member receiving screw elements to be assembled, a rotary washer feeding disc receiving washers to be assembled and carrying said washers to a position in the path of movement of the screw elements carried by said reciprocating member, a ratchet secured to the disc, a pawl for intermittently operating said ratchet, a cam rotating about a common axis with said disc for controlling the operation of said pawl, means for reciprocating said screw receiving member including a second cam rotating about a common axis with the first cam and with said disc and a driving connection between said cams whereby the disc and the reciprocating member are driven in proper timed relation.

6. In a screw and washer assembling device means for feeding washers in succession to a predetermined point and an assembly mechanism for receiving screw elements in succession and carrying and inserting said elements into washers at said predetermined point, said assembly mechanism comprising a reciprocable bar, a pair of screw receiving jaw members carried by said bar and relatively shiftable to receive and clamp a screw element to the bar and to release the screw element from the bar, a member encircling the bar and engaging said jaw members as the bar approaches one limit of its movement to move the jaw members relatively into partially open position to receive a screw element and a member encircling said jaw members and engaging said jaw members as the bar approaches its other limit of movement to shift the jaw members relatively into a full open position releasing the screw element.

7. In a mechanism for assembling screw and washer elements an assembly head comprising a fixed housing, a tube slidably mounted on said housing, a pair of screw receiving jaw members fulcrumed on the outer surface of the tube and movable oppositely to clamp and release the screw element and a second tube encircling a portion of the first tube, said second tube having an inner annular shoulder adapted to engage said jaw members as the first tube approaches one limit of its movement, whereby to shift said jaw members oppositely into an open position.

8. In a device for assembling screw and washer elements a housing, a tubular member slidably mounted in said housing, a pair of screw receiving jaw members fulcrumed on said tubular member for movement with and relative to said tubular member, yieldable means normally urging said jaw members to closed position, a second tubular member fixed to said housing and having a longitudinally tapering surface engaging said jaw members as the first tubular member approaches a limit of its movement to move said jaw members into an open position.

9. In a device for assembling screw and washer elements a housing, a tubular member slidably mounted in said housing, a pair of screw receiving jaw members fulcrumed on said tubular member for movement with and relative to said tubular member, yieldable means normally urging said jaw members to closed position, a second tubular member fixed to said housing and having a longitudinally tapering surface engaging said jaw members as the first tubular member approaches a limit of its movement to move said jaw member into an open position, and a plunger slidably mounted in said first tubular member and adapted to engage the head of a screw element received in said jaw members for preventing axial movement of said screw element relative to the jaw members.

10. In a device for assembling screw and washer elements a housing, a tubular member slidably mounted in said housing, a pair of screw receiving jaw members fulcrumed on said tubular member for movement with and relative to said tubular member, a spring pressed member normally urging said jaw members to closed position, a second tubular member fixed to said housing and having a longitudinally tapering surface engaging said jaw members as the first tubular member approaches a limit of its movement to move said jaw member into an open position, and a plunger slidably mounted in the first tubular member, means operatively connecting said plunger to said first tubular member for movement in unison therewith, said connecting means including a lost motion connection permitting movement of the plunger relative to the first tubular member from a position spaced from a head of a screw element in the jaw members to a position engaging the head of the screw element whereby the plunger in moving in unison with the first tubular member prevents axial and tilting movements of the screw element relative to the jaw members.

11. In a mechanism for assembling screw and washer elements, an assembly device comprising a pair of screw receiving jaw members, a tubular member upon the external surface of which said jaw members are fulcrumed, a spring pressed member carried by the tubular member and engaging and normally urging the jaw members into closed position, a sleeve encircling the tubular member and having an internal longitudinally tapering surface adapted to engage the jaw members as the tubular member approaches its limit of movement in one direction to move the jaw members into open position, and a second sleeve encircling the tubular member and having an inner annular shoulder adapted to engage the jaw members as the tubular member approaches its limit of movement in the opposite direction to again open the jaw members.

12. A washer feeding device comprising a hopper, a rotary washer feeding disc forming a wall portion of the hopper, said washer feeding disc having peripheral recesses therein to receive washers from a mass of washers in the hopper, said rotary disc extending beyond a transverse wall portion of the hopper so that the washers are carried by the disc out of the hopper, and driving mechanism for said disc comprising a ratchet secured to the disc, a pawl for operating said ratchet, spring means for moving said pawl in one direction and a cam rotating about a common axis with the ratchet and disc for moving the pawl in the opposite direction.

13. In a screw working machine the combination of a washer container, a rotary disc for carrying washers from a mass of washers in the container to a point outside of the container, a pair of spaced guide bars onto which the washers are moved by the disc, a device for telescoping screw elements with washers positioned upon the guide bars, a member within the container and along which the washers are moved out of the container by the disc and an adjustable member having a surface flush with the surface of the guide bars and flush with the surface of the member along which the washers are moved in the container.

14. In a screw working machine the combination of a washer container, a rotary disc for carrying washers from a mass of washers in the container to a point outside of the container, a pair of spaced guide bars onto which the washers are moved by the disc, a device for telescoping screw elements with washers positioned on said guide bars, a member within the container and along which the washers are moved out of the container by the disc, and an adjustable member flush with the surface of the guide bars and the surface of the member along which the washers are moved in the container and extending from the guide bars to the member in the container so that the washers may be conveyed back to the container from the guide bars if while the washers are upon the guide bars, screw elements should not be telescoped into the washers.

15. In a washer feeding device, a washer hopper, a rotary disc forming a wall portion of the hopper and carrying washers from a mass of washers in the hopper to a point outside the hopper, a ratchet and pawl for operating said disc, a device for telescoping a screw element with each washer at said point, means for feeding the telescoped screws and washers away from said point, and means actuated by telescoped units being fed from said point for preventing the pawl from engaging the ratchet whereby to suspend operation of the rotary disc if a unit becomes jammed in said feeding means.

16. In a device for feeding washers, a washer hopper comprising an annular shell, a rotary disc having a plurality of peripheral notches for receiving washers, a member underlying the notches in the disc and cooperating with the disc to close the bottom end of the shell, said disc extending outside the shell to carry washers placed in the hopper to a point outside of the hopper, and an annular strip embracing the disc within the shell and having a hardened inner surface along which the washers are carried by the disc.

17. In a machine of the character described having means for feeding screw elements, a washer container, a device which carries the washers from the container to an instrumentality which telescopes each washer with a screw element and which device then carries the telescoped washers and screw elements to the screw element feeding means, and a device for suspending operation of the washer carrying device if a screw and washer unit becomes jammed in said screw element feeding means.

18. In a machine having means for feeding screw elements, washer feed means including a rectilinearly movable slide, a pair of jaws carried by the slide and oppositely shiftable to open and closed positions, means operable at one limit of movement of the slide to shift the jaws to an open position for receiving screw elements, means operable to move the jaws to a closed position to clamp a screw element thereto for movement with the slide to telescope the screw into a washer fed into the path of the slide, means operable at the other limit of movement of the slide to shift the jaws to an open position releasing the screw element, and driving means for moving the slide between said limits of movement, said driving means including an adjustable connection for determining the limits of movement of the slide.

19. In a machine according to claim 8 wherein the means operable at the other limit of movement of the slide to move the jaws to an open position releasing the screw element comprises a stationary member engageable with the jaws and adjustably mounted to determine the extent to which the jaws are moved apart to said open position.

20. In a device for assembling screw and washer elements, a support, washer feeding means including a rotary disc having washer receiving openings for conveying washers to a predetermined point, a slide bar movable along a rectilinear path transverse to the disc, relatively shiftable members carried by said slide bar, means for relatively shifting said members to clamp and release a screw element, means for driving said slide, means for detachably mounting said rotary disc on said support for replacement to accommodate washers of different sizes, and means for mounting said slide driving means and said means for shifting said members on said support for adjustment relative to the axis of the disc.

21. In a mechanism for assembling screw and washer elements, an assembly head compriing a fixed housing, a bar slidably mounted in said housing, a pair of screw-receiving jaw members fulcrumed on the outer surface of the bar and movable oppositely to clamp and release the screw element, and a member having a portion encircling a portion of the first bar adjacent one limit of movement of the bar, said member having internal abutment means adapted to engage said jaw members as the bar approaches that limit of movement whereby to shift said jaw members oppositely into an open position.

22. In a mechanism for assembling screw and washer elements, an assembly head comprising a fixed housing, a bar slidably mounted in said housing, a pair of screw-receiving jaw members fulcrumed on the outer surface of the bar and movable oppositely to clamp and release the screw element, and a member encircling a portion of the bar adjacent one limit of the movement of the bar, said member having internal tapering surface means adapted to engage said jaw members as the bar approaches that limit of movement whereby to shift said jaw members oppositely into an open position.

23. In a mechanism for assembling screw and washer elements, an assembly head comprising a fixed housing, a bar slidably mounted in said housing, a pair of screw-receiving jaw members fulcrumed on the outer surface of the bar and movable oppositely to clamp and release the screw element, a member having a portion encircling a portion of the bar adjacent one limit of movement of the bar, said portion of the member having internal abutment means adapted to engage said jaw members as the bar approaches that limit of movement whereby to shift said jaw members oppositely into an open position, a member having a portion encircling the bar adjacent the other limit of movement of the bar, said portion of the second member having internal tapering surface means adapted to engage said jaw member as the bar approaches said other limit of movement to move said jaws into an open position, and spring-pressed means in said second member for engaging and normally urging said jaws toward closed position.

24. In a mechanism for assembling screw and washer elements, an assembly head comprising a fixed housing, a tube slidably mounted in said housing, a pair of screw-receiving jaw members fulcrumed on the outer surface of the tube and movable oppositely to clamp and release the screw element, means having portions encircling the tube adjacent its limits of movement, said portions of said members having internal abutment means adapted to engage said jaw members as the tube approaches said limits of movement whereby to shift said jaw members oppositely into open positions, and a rod mounted in said tube and having a limited slide movement relative to the tube for engaging the head of a screw received in the jaw members.

25. In a mechanism for assembling screw and washer elements, an assembly head comprising a fixed housing, a tube slidably mounted in said housing, a pair of screw-receiving jaw members fulcrumed on the outer surface of the tube and movable oppositely to clamp and release the screw element, means having portions encircling the tube adjacent its limits of movement, said portions of said members having internal abutment means adapted to engage said jaw members as the tube approaches said limits of movement whereby to shift said jaw members oppositely into open positions, a rod slidably mounted in said tube, means adapted to connect the rod to the tube after a limited movement relative to the tube, and driving means connected to said rod for actuating the rod through said limited relative movement and thereafter actuating said tube.

26. In a mechanism for assembling screw and washer elements, an assembly head comprising a fixed housing, a bar slidably mounted in said housing, a pair of screw-receiving jaw members fulcrumed on the outer surface of the bar and movable oppositely to clamp and release the screw element, and a member having a portion encircling a portion of the first bar adjacent one limit of movement of the bar, said member having internal abutment means adapted to engage said jaw members as the bar approaches that limit of movement whereby to shift said jaw members oppositely into an open position, means for adjustably mounting said member on said housing for adjustment to determine the opening movement of the jaws.

27. In a mechanism for assembling screw and washer elements, an assembly head comprising a fixed housing, a bar slidably mounted in said housing, a pair of screw-receiving jaw members fulcrumed on the outer surface of the bar and movable oppositely to clamp and release the screw element, a member encircling a portion of the bar adjacent one limit of the movement of the bar, said member having internal tapering surface means adapted to engage said jaw members as the bar approaches that limit of movement whereby to shift said jaw members oppositely into an open position, and means for adjustably mounting said member on said housing for adjustment to determine the opening movement of the jaws.

28. In a mechanism for assembling screw and washer elements, an assembly head comprising a fixed housing, a tube slidably mounted in said housing, a pair of screw-receiving jaw members fulcrumed on the outer surface of the tube and movable oppositely to clamp and release the screw element, means having portions encircling the tube adjacent its limits of movement, said portions of said members having internal abutment means adapted to engage said jaw members as the tube approaches said limits of movement whereby to shift said jaw members oppositely into open positions, a rod slidably mounted in said tube for engaging the head of a screw received in said jaw members, and an adjustable lost motion connection between said rod and tube for relative adjustment of said tube and rod to determine a limited relative movement between said rod and tube to accommodate screws of different sizes.

29. In a mechanism for assembling screw and washer elements, an assembly head compriing a fixed housing, a tube slidably mounted in said housing, a pair of screw-receiving jaw members fulcrumed on the outer surface of the tube and movable oppositely to clamp and release the screw element, means having portions encircling the tube adjacent its limits of movement, said portions of said members having internal abutment means adapted to engage said jaw members as the tube approaches said limits of movement whereby to shift said jaw members oppositely into open positions, and stationary abutment means adjustably mounted on the housing for adjustment to determine the limits of movement of the tube.

30. In a screw working machine having an inclined feeding chute which is severable transversely to provide vertically spaced chute parts, the chute being mounted upon a body support having a shelf extending laterally from the longitudinal plane of the chute, the combination of an open-sided washer hopper having a rotatable washer feeding disk carrying washers out of the open side of the hopper, a screw and washer telescoping mechanism movable transversely of the plane of the disk to insert a screw element in a washer held in the disk, a supporting bracket provided with means for attaching the bracket to the shelf of the machine body support and with means for adjustably mounting the hopper and the telescoping mechanism on said bracket for adjustably positioning the disk to carry washers onto the surface of the lower chute part and the telescoping mechanism to receive screw elements from the upper chute part, a motor mounted on said bracket, driving mechanism between said motor, said disk and said telescoping mechanism, said driving mechanism including a detachable connection to said disk and an adjustable connection to said telescoping mechanism for permitting replacement of the disk and adjustment of the telescoping mechanism to accommodate washers and screw elements of different sizes.

31. In a mechanism for assembling screw and washer elements, an assembly head comprising a fixed housing, a tube slidably mounted on said housing, a pair of screw receiving jaw members fulcrumed on the outer surface of the tube and movable oppositely to clamp and release the screw element, a second tube encircling a portion of the first tube, said second tube having an inner annular shoulder adapted to engage said jaw members as the first tube approaches one limit of its movement whereby to shift said jaw members oppositely into a partially open position, abutment means engaging said jaw members as the first tube approaches its other limit of movement whereby to shift said jaw members oppositely into open position, a washer hopper, a rotary washer feeding disc forming a wall portion of the hopper, said washer feeding disc having peripheral recesses therein to receive washers from a mass of washers in the hopper, said rotary disc extending beyond a transverse wall portion of the hopper, and said hopper and disc being so positioned that the washers are carried by the disc out of the hopper into alinement with a screw received in said jaw members, said hopper having an annular strip embracing the disc within the hopper, said strip having a hardened inner surface along which the washers are carried by the disc, driving mechanism for said disc and comprising a ratchet secured to the disc, a pawl for operating said ratchet, spring means for moving said pawl in one direction, and cams rotating about a common axis with the ratchet and disc for moving the pawl in the opposite direction and operatively connected to said first tube for rectilinearly shifting said tube in timed relation with the rotation of said disc.

32. In a screw working machine, the combination with a washer container, an assembly device which telescopes each washer with a screw element, and means which carries the washers from the container to the assembly device, said assembly device including a support, a slide bar, a pair of jaws carried by the slide bar and oppositely shiftable to opened and closed positions, means normally urging said jaws to closed position to engage the shank of a screw element and clamp the same therebetween, means operable at one limit of movement of the slide bar to shift the jaws against the action of said closing means to partially open position, said jaws forming when in partially open position a screw receiving opening to receive screw elements fed thereto, and each jaw having a portion projecting inwardly of the opening at the rear side of the jaw to engage the shank of a screw element when the jaws are in partially open position to prevent passage of the screw element through the jaws, means operable in the other limit of movement of the slide bar to shift the jaws against the action of said closing means to a full open position releasing the screw element for passage from the jaws, through said projecting portions of the jaws, and means for moving said slide bar between said limits of movement.

33. In a screw working machine according to claim 32, wherein there is provided a common mounting and supporting base for the washer carrying means and the support of the assembly device, and means is provided for relatively adjusting the positions of the washer carrying means and the support of the assembly device on the base properly to position the washer in the path of a screw element carried by said jaws.

OUGLJESA J. POUPITCH.

CERTIFICATE OF CORRECTION.

Patent No. 2,343,798. March 7, 1944.

OUGLJESA J. POUPITCH.

It is hereby certified that error appears in the printed specification of the above numbered patent requiring correction as follows: Page 13, second column, line 63, claim 19, for the claim reference numeral "8" read --18--; page 14, first column, line 12, claim 21, for "compriing" read --comprising--; and that the said Letters Patent should be read with this correction therein that the same may conform to the record of the case in the Patent Office.

Signed and sealed this 15th day of August, A. D. 1944.

Leslie Frazer

(Seal) Acting Commissioner of Patents.